United States Patent
Holden et al.

(10) Patent No.: US 8,639,733 B2
(45) Date of Patent: Jan. 28, 2014

(54) AUTOMATIC IDENTIFICATION OF COMPATIBLE APPLICATIONS AND ACCESSORIES

(75) Inventors: Paul Holden, Sunnyvale, CA (US);
Lawrence Bolton, Fremont, CA (US);
Nitin Ganatra, San Jose, CA (US);
Mitchell Adler, Cupertino, CA (US);
Emily Clark Schubert, San Jose, CA (US); Shyam Toprani, Los Altos, CA (US); John Ananny, Cupertino, CA (US); Peter Langenfeld, Belmont, CA (US); Scott Krueger, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/720,400

(22) Filed: Mar. 9, 2010

(65) Prior Publication Data
US 2010/0235373 A1     Sep. 16, 2010

Related U.S. Application Data

(60) Provisional application No. 61/160,601, filed on Mar. 16, 2009, provisional application No. 61/160,644, filed on Mar. 16, 2009.

(51) Int. Cl.
*G06F 17/30* (2006.01)
(52) U.S. Cl.
USPC .......................................... 707/827; 717/178
(58) Field of Classification Search
USPC ..................... 707/821, 827; 717/174–178
See application file for complete search history.

(56) References Cited

U.S. PATENT DOCUMENTS

| | | |
|---|---|---|
| 5,511,169 A | 4/1996 | Suda |
| 5,938,738 A | 8/1999 | Mu-Teng |
| 6,189,102 B1 | 2/2001 | Beser |
| 6,443,839 B2 | 9/2002 | Stockdale et al. |
| 6,604,157 B1 | 8/2003 | Brusky et al. |
| 6,671,749 B2 | 12/2003 | Williams et al. |

(Continued)

FOREIGN PATENT DOCUMENTS

| | | |
|---|---|---|
| DE | 10 2005 048427 B3 | 5/2007 |
| EP | 1898306 A1 | 3/2008 |

(Continued)

OTHER PUBLICATIONS

Carey, D., "Turning a mobile phone into wallet", Electronic Engineering Times, n 1441, p. 64, Sep. 18, 2006, 2 pages.

(Continued)

*Primary Examiner* — Khanh Pham
(74) *Attorney, Agent, or Firm* — Kilpatrick Townsend & Stockton LLP

(57) ABSTRACT

Embodiments of the present invention provide various communication techniques for communication between a mobile computing device and an accessory. An accessory protocol that is generic to the mobile computing device can be used for some communication. An application executing at the mobile computing device can communicate with the accessory using an application communication protocol. In some embodiments, the application communication protocol can be different from the accessory communication protocol. In other embodiments the application protocol may only be recognized by the application and the accessory. In some embodiments, messages conforming to an application protocol can be communicated between the application and the accessory by packaging the messages inside a message conforming to the accessory communication protocol.

38 Claims, 15 Drawing Sheets

(56) References Cited

U.S. PATENT DOCUMENTS

| | | |
|---|---|---|
| 6,742,061 B1 | 5/2004 | Hellberg |
| 6,789,111 B1 | 9/2004 | Brockway et al. |
| 6,976,092 B1 | 12/2005 | Daniell et al. |
| 7,047,558 B1 | 5/2006 | Mariana |
| 7,062,261 B2 | 6/2006 | Goldstein et al. |
| 7,167,935 B2 | 1/2007 | Hellberg |
| 7,334,227 B2 * | 2/2008 | Kim et al. ............... 717/178 |
| 7,493,327 B1 | 2/2009 | Fenelon |
| 7,526,588 B1 | 4/2009 | Schubert et al. |
| 7,536,393 B1 | 5/2009 | Fenelon |
| 7,590,621 B1 | 9/2009 | Fenelon |
| 7,616,760 B2 | 11/2009 | Trip et al. |
| 7,783,702 B2 | 8/2010 | Liu et al. |
| 7,873,384 B2 | 1/2011 | Karaoguz et al. |
| 8,060,012 B2 | 11/2011 | Sklovsky et al. |
| 8,117,651 B2 | 2/2012 | Novotney et al. |
| 8,191,109 B2 | 5/2012 | Rhodes |
| 8,289,688 B2 | 10/2012 | Behar et al. |
| 2002/0167932 A1 | 11/2002 | McGowan |
| 2002/0172220 A1 | 11/2002 | Baker et al. |
| 2003/0060896 A9 * | 3/2003 | Hulai et al. ............... 700/1 |
| 2003/0154425 A1 * | 8/2003 | Kim ............... 714/25 |
| 2003/0158954 A1 | 8/2003 | Williams |
| 2003/0220988 A1 | 11/2003 | Hymel |
| 2004/0192274 A1 | 9/2004 | Vuori |
| 2004/0204029 A1 | 10/2004 | Parry |
| 2004/0250002 A1 | 12/2004 | Hellberg |
| 2005/0097248 A1 | 5/2005 | Kelley |
| 2005/0262269 A1 | 11/2005 | Pike |
| 2006/0031126 A1 | 2/2006 | Ma et al. |
| 2006/0291483 A1 | 12/2006 | Sela |
| 2007/0004463 A1 | 1/2007 | Clark et al. |
| 2007/0050350 A1 | 3/2007 | Nakamura |
| 2007/0082699 A1 | 4/2007 | Karaoguz et al. |
| 2007/0090922 A1 | 4/2007 | Weingarth et al. |
| 2007/0180445 A1 * | 8/2007 | Greeff ............... 717/174 |
| 2007/0271387 A1 | 11/2007 | Lydon |
| 2008/0098094 A1 * | 4/2008 | Finkelstein et al. ......... 709/220 |
| 2008/0102821 A1 | 5/2008 | Jalon |
| 2008/0240058 A1 | 10/2008 | Hansen et al. |
| 2008/0248835 A1 | 10/2008 | Hansson et al. |
| 2008/0320190 A1 | 12/2008 | Lydon |
| 2009/0024757 A1 * | 1/2009 | Proctor ............... 709/232 |
| 2009/0037515 A1 | 2/2009 | Zapata et al. |
| 2009/0083803 A1 | 3/2009 | Alshaykh et al. |
| 2009/0181649 A1 | 7/2009 | Bull et al. |
| 2009/0241179 A1 | 9/2009 | Hady |
| 2009/0244012 A1 | 10/2009 | Behar et al. |
| 2009/0244832 A1 | 10/2009 | Behar et al. |
| 2010/0107097 A1 * | 4/2010 | Ferlitsch ............... 715/764 |
| 2010/0114957 A1 | 5/2010 | Benson et al. |
| 2010/0131691 A1 | 5/2010 | Chatterjee et al. |
| 2010/0138914 A1 | 6/2010 | Davis et al. |
| 2010/0159904 A1 | 6/2010 | Colligan et al. |
| 2010/0161720 A1 | 6/2010 | Colligan et al. |
| 2010/0178871 A1 | 7/2010 | House |
| 2010/0233961 A1 | 9/2010 | Holden |
| 2010/0235373 A1 | 9/2010 | Holden et al. |
| 2010/0235425 A1 | 9/2010 | Holden |
| 2010/0235454 A1 | 9/2010 | Holden |
| 2010/0235518 A1 | 9/2010 | Holden |
| 2010/0235552 A1 | 9/2010 | Holden |
| 2010/0255908 A1 | 10/2010 | Grimes |
| 2011/0055407 A1 | 3/2011 | Lydon et al. |
| 2011/0170456 A1 | 7/2011 | Marseille et al. |
| 2012/0023185 A1 | 1/2012 | Holden et al. |
| 2012/0023199 A1 | 1/2012 | Holden |
| 2012/0081207 A1 | 4/2012 | Toprani et al. |

FOREIGN PATENT DOCUMENTS

| | | |
|---|---|---|
| JP | 2006-108899 A | 4/2006 |
| JP | 4842383 B2 | 9/2011 |
| WO | 2003/012577 A2 | 2/2003 |
| WO | WO 2007/066174 A1 | 6/2007 |
| WO | 2007/114850 A1 | 10/2007 |
| WO | WO 2010/107660 A1 | 9/2010 |

OTHER PUBLICATIONS

Google Releases Car Home App Into the Android Market [Car Home App for Android Now Available in the Android Market, for Those Running Android 2.2], web-pages downloaded from nexus404.com/.../google-releases-car-h . . . , 7 pages, Oct. 2010.

International Application No. PCT/US2010/027058, International Search Report and Written Opinion, 13 pages, Apr. 26, 2010.

"A Specification of the Bluetooth System" "Bluetooth" Jul. 26, 2007, Copyright 1999; Agere Systems Inc et al., 1420 pages.

"Bluetooth" Wikipedia, the free Encyclopedia, downloaded on Jan. 11, 2010, Retrieved from the Internet: URL:http://en.wikipedia.org/w/index.php?ti tle=Bluetooth&oldid=273620532; 16 pages.

"Reverse-DNS" Wikipedia, the free Encyclopedia, downloaded on Jan. 11, 2010 Retrieved from the Internet: URL:http://en.wikipedia.org/w/index.php?ti tle=Reverse-DNS&oldid=270747273; 2 pages.

U.S. Appl. No. 13/250,681, filed Sep. 30, 2011, Holden et al.

U.S. Appl. No. 13/250,900, filed Sep. 30, 2011, Holden et al.

Tanenbaum, Andrew S.; Structured Computer Organization; 1984; Prentice-Hall, Inc.; Second Edition; pp. 10-11, 4 pages.

International Search Report and Written Opinion in PCT/US2011/052827, mailed Nov. 28, 2011, 9 pages.

Wikipedia, "Reverse DNS lookup", Accessed Mar. 11, 2012, http://en.wikipedia.org/wiki/Reverse_DNS_lookup; 3 pages.

Notice of Allowance mailed Jul. 26, 2013, U.S. Appl. No. 12/720,423, 33 pages.

Notice of Allowance mailed Nov. 14, 2012, U.S. Appl. No. 12/720,446, 5 pages.

Non-Final Office Action mailed Jan. 3, 2013, U.S. Appl. No. 12/720,400, 22 pages.

Non-Final Office Action mailed Jan. 4, 2013, U.S. Appl. No. 12/720,423, 8 pages.

Notice of Allowance mailed Nov. 15, 2012, U.S. Appl. No. 13/250,681, 6 pages.

Non-Final Office Action mailed Apr. 3, 2013, U.S. Appl. No. 12/720,375, 26 pages.

Non-Final Office Action mailed May 8, 2013, U.S. Appl. No. 13/085,952, 34 pages.

Office Action mailed Oct. 9, 2013 in U.S. Appl. No. 12/720,349, 7 pages.

European Search Report mailed Sep. 26, 2013 in EP 13166559.8, 8 pages.

Japanese Office Action mailed Sep. 30, 2013 in JP 2011-220451, 2 pages, English Translation.

European Search Report mailed Oct. 7, 2013 in EP 13166560.6, 5 pages.

USB Implementers Forum, "Universal Serial Bus Specification Revision 2.0," Chapters 1-5 and 9, internet citation, Apr. 27, 2000, Retrieved from the internet, <URL: http://www.usb/org/developers/docs/usb_20_05122006.zip> [retrieved on Dec. 19, 2006], title page and table of contents only.

Hulvey, Robert, "Device Identification Profile Specification," Bluetooth Specification, Jul. 26, 2007, Retrieved from the internet: http://www.bluetooth.org/DeviceID_Spec_V13.pdf [retrieved on Sep. 23, 2013], 22 pages.

Office Action mailed Nov. 29, 2013 in U.S. Appl. No. 12/720,375, 20 pages.

* cited by examiner

AUTOMATIC IDENTIFICATION OF COMPATIBLE APPLICATIONS AND ACCESSORIES

CROSS REFERENCE

This application claims the benefit of U.S. Provisional Patent Application No. 61/160,601, entitled "Accessory and Mobile Computing Device Communication Using An Accessory Communication Protocol," filed Mar. 16, 2009, and U.S. Provisional Patent Application Serial No. 61/160,644, entitled "Accessory Attachment Protocol," filed Mar. 16, 2009, the entire disclosures of which are incorporated herein by reference for all purposes.

BACKGROUND

The present disclosure relates generally to communication between an accessory and a mobile computing device and in particular to using accessory and/or application specific protocols for such communications.

Mobile computing devices have become ubiquitous. Various companies have created mobile computing devices, such as the iPhone™, iPod Touch™, various BlackBerry® devices, and smart phones compatible with Google's Android™ platform, to name a few. Mobile computing devices often include web browsers, word processors, email applications, maps, telephone services, games, audio applications, video applications, etc. Moreover, accessories have also been created for use with mobile computing devices. Such accessories can communicate with a mobile computing device using one or more connectors and/or ports. Such accessories can be used to control features of the mobile computing device or used by the mobile computing device to interact with users and/or the environment.

BRIEF SUMMARY

According to various embodiments, an accessory may communicate with an application executing on a mobile computing device using an accessory specific communication protocol and/or an application specific communication protocol. For example, when an accessory couples with a mobile computing device it may perform initialization, identification, and/or authentication procedures using an accessory protocol defined by the mobile computing device. The accessory may also communicate information indicating one or more application protocols that may be used by an application executing on the mobile computing device to communicate with the accessory. In some embodiments, an application protocol can be different from the accessory protocol, while in other embodiments an application protocol can be the same as the accessory protocol. In some embodiments, an application protocol packet can be nested within portions of an accessory protocol packet.

Various embodiments disclosed herein describe methods for creating communication sessions between accessories and applications. Some embodiments describe how an accessory provides the proper information for the mobile computing device to open a communication session using an application protocol. Other embodiments describe various schemes at the mobile computing device for selecting an application protocol, opening communication streams, downloading a preferred application, communicating with an accessory, nesting application protocol packets within an accessory protocol packet, etc. In some embodiments, an application manager executing at a mobile computing device can be used to abstract the communication between an accessory and an application.

The following detailed description, together with the accompanying drawings, will provide a better understanding of the nature and advantage of the embodiments disclosed herein.

DETAILED DESCRIPTION

Various embodiments of the invention disclosed herein are directed toward various aspects of communication between accessory devices and a mobile computing device. In some embodiments, an accessory can communicate with a mobile computing device using an accessory communication protocol. An accessory communication protocol can specify communication commands, transport links, authentication routines, identification processes, lingoes, packet structures, data types, or any other suitable command or data that can be used to communicate between an accessory device and a mobile computing device.

An application executing on a mobile computing device can also communicate with the accessory using an application communication protocol. In some embodiments, an application communication protocol can specify communication commands, packet structures, data types, lingoes, message formats, etc., for communication between the application and the accessory. In some embodiments, at least some of the communication commands, packet structures, data types, lingoes, message formats specified by the application communication protocol can be different from those specified by the accessory communication protocol. In other embodiments, at least some of the communication commands, packet structures, data types, lingoes, message formats specified by the application communication protocol can be the same as those specified by the accessory communication protocol.

In some embodiments, the application protocol can use the transport link specified by the accessory communication protocol. An application communication protocol can be developed, for example, by the developer of the application and/or accessory. In some embodiments, an application communication protocol can include application and/or accessory specific commands, data structures, etc. Furthermore, the terms "application communication protocol" and "application protocol" can be used interchangeably. The terms "accessory communication protocol", "accessory communication protocol", "general communication protocol", and "general protocol" can also be used interchangeably.

Figure 1A:
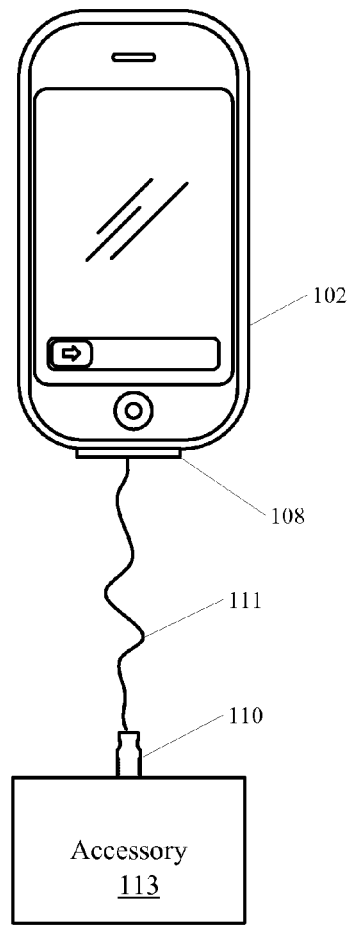
FIG. 1A shows a mobile computing device coupled with an accessory device according to some embodiments of the invention.
Figure 1B:
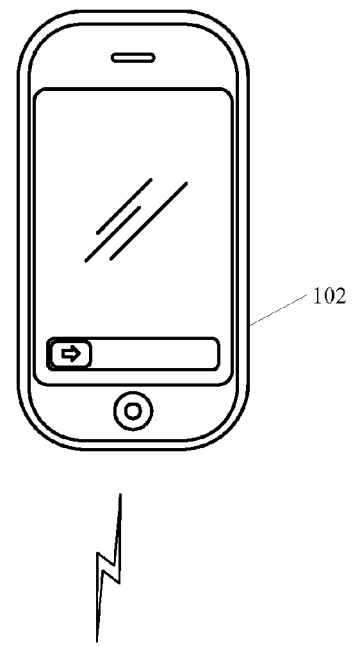
FIG. 1B shows an accessory device wirelessly coupled with a mobile computing device according to some embodiments of the invention.

FIG. 1A shows a mobile computing device 102 coupled with an accessory device 113. Cable 111 is used to couple mobile computing device 102 with accessory device 113. Cable 111 can include connector 108 to connect with mobile computing device 102 and connector 110 to connect with accessory device 113. FIG. 1B shows accessory device 113 wirelessly coupled with mobile computing device 102.

The mobile computing device shown in FIGS. 1A and 1B, can be any type of mobile computing and/or communication device without limitation. For example, an iPod Touch™, an iPhone™, an Android compatible device and/or a Blackberry device can be used. Moreover, mobile computing device 102 can provide media player capability, networking, web browsing, email, word processing, data storage, application execution, and/or any other computing or communication functions.

Accessory 113 can be any device capable of communicating with mobile computing device 102 such as, for example, an external speaker system; an external video device; a multimedia device; a consumer electronic device; a test instrument; a home appliance (e.g., refrigerator or dishwasher); exercise equipment; a security system; a home or office automation system; a camera; a user input device (e.g., keyboard, mouse, game controller); a measurement device; a medical device (e.g., glucose monitor or insulin monitor); a point of sale device; an automobile; an automobile accessory (e.g., a car stereo system or car navigation system); a radio (e.g., FM, AM and/or satellite); an entertainment console on an airplane, bus, train, or other mass transportation vehicle; etc. Any type of device that can be used in conjunction with a mobile computing device can be used as an accessory device.

Figure 2:
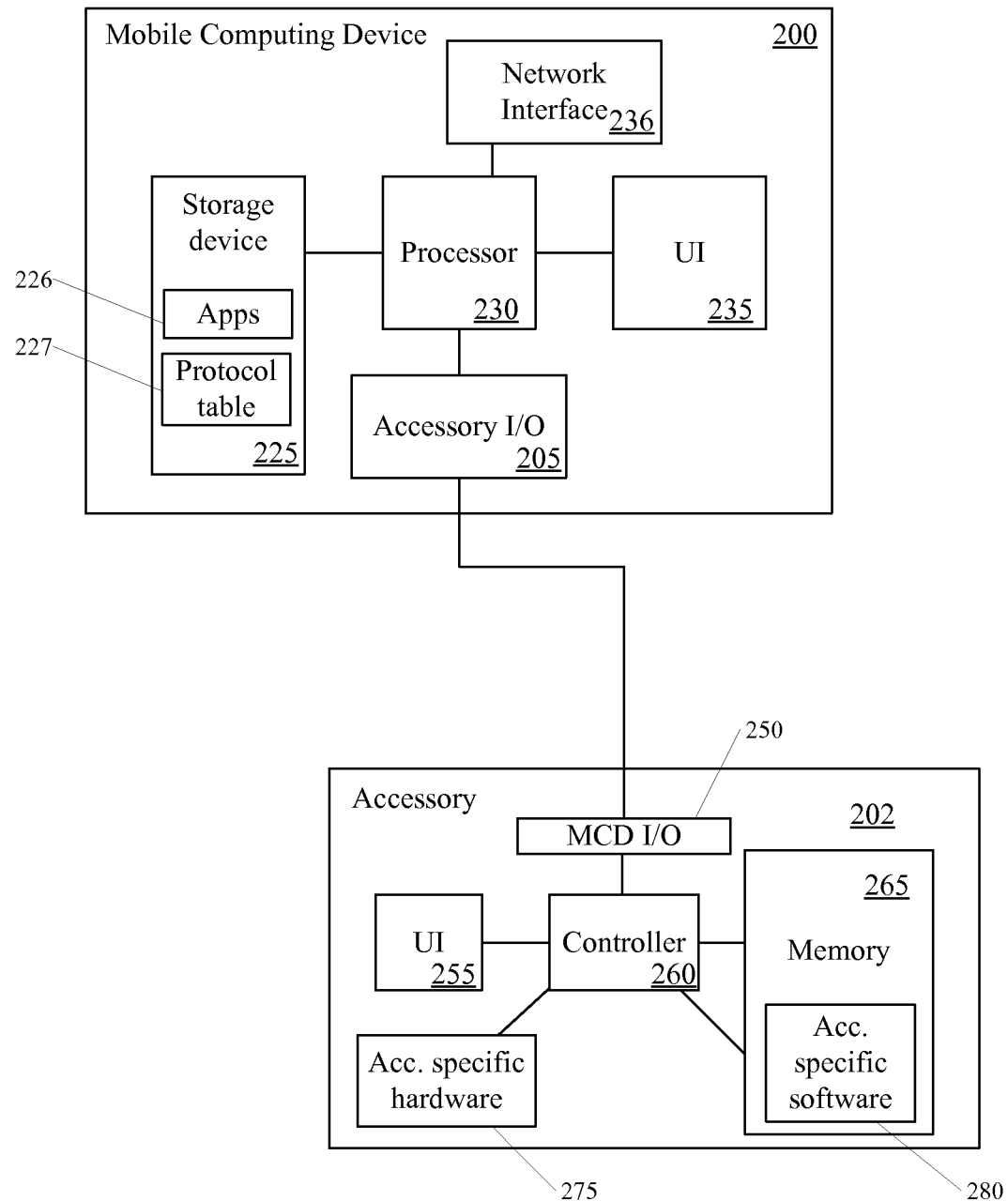
FIG. 2 shows a block diagram of a mobile computing device coupled with an accessory according to one embodiment.

FIG. 2 shows a block diagram of mobile computing device 200 (e.g., implementing mobile computing device 102 of FIG. 1A or 1B) coupled with an accessory 202 (e.g., implementing accessory 113 of FIG. 1A or 1B) according to one embodiment. Mobile computing device 200 can include processor 230, storage device 225, user interface (UI) 235, network interface 236, and accessory input/output (I/O) interface 205.

Processor 230, which can be implemented as one or more integrated circuits (including, e.g., a conventional microprocessor or microcontroller), can control the operation of mobile computing device 200. For example, in response to user input signals provided by user interface 235, processor 206 can perform various tasks such as selecting and playing media assets that may be stored in storage device 225; accessing various networks (e.g., a mobile telephone network, the Internet, local area network, or the like) to send and/or retrieve data using network interface 236; executing various application programs (Apps) 226 residing on storage device 225; and so on. Processor 230 can also manage communication with accessories via accessory I/O interface 205.

User interface 235 can include input controls such as a touch pad, touch screen, scroll wheel, click wheel, dial, button, keypad, microphone, etc., as well as output devices such as a display screen, indicator lights, speakers, headphone jacks, etc., together with supporting electronics (e.g., digital-to-analog or analog-to-digital converters, signal processors or the like). A user can operate the various input controls of user interface 235 to invoke the functionality of mobile computing device 200 and can also view and/or hear output from mobile computing device 200 via user interface 235.

Storage device 225 may be implemented, e.g., using disk, flash memory, or any other non-volatile storage medium. Storage device 225 can store application programs 226 that are executable by processor 230, system programs and other program code (not explicitly shown), and various data such as protocol table 227 that can be used in managing communication with various accessories, as described below. In some embodiments, storage device 225 can also store media assets such as audio, video, still images, or the like, that can be played by mobile communication device 200, along with metadata describing the media assets (e.g., asset name, artist, title, genre, etc.), playlists (lists of assets that can be played sequentially or in random order), and the like. Storage device 225 can also store any other type of information such as information about a user's contacts (names, addresses, phone numbers, etc.); scheduled appointments and events; notes; and/or other personal information.

Application programs (also referred to herein as "applications" or "apps") 226 can include any program executable by processor 230. In some embodiments, certain applications can be installed on mobile computing device 200 by its manufacturer, while other applications can be installed by a user. Examples of application programs can include video game programs, personal information management programs, programs for playing media assets and/or navigating the media asset database, programs for controlling a telephone interface to place and/or receive calls, and so on. Certain application programs 226 may provide communication with and/or control of accessory 202, and certain application programs 226 may be responsive to control signals or other input from accessory 202; examples are described below.

Network interface 236 can provide an interface to one or more communication networks. For example, network interface 236 can incorporate a radio-frequency (RF) transceiver and suitable components for communicating via a mobile communication network such as a mobile telephone network. Additionally or instead, network interface 236 can incorporate a wireless connection to the Internet (e.g., a WiFi transceiver, 3G transceiver or the like), to a personal area network (e.g., a Bluetooth network), or any other network. In still other embodiments, a wired network connection (e.g., Ethernet) may be provided. In some embodiments, the same hardware can be used to support connections to multiple networks; thus, network interface 236 can include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. In some embodiments, some operations associated with network connectivity can be implemented entirely or in part as programs executed on processor 230 (e.g., encoding, decoding, and/or other processing in the digital domain), or a dedicated digital signal processor can be provided.

Accessory I/O interface 205 can include a number of signal paths configured to carry various signals between mobile computing device 200 and accessory 202. In one embodiment, accessory I/O interface 205 includes a 30 pin connector corresponding to the connector used on iPod® and iPhone™ products manufactured and sold by Apple Inc.; other connectors can also be used. Alternatively or additionally, accessory I/O interface 205 can include a wireless interface (e.g., Bluetooth or the like).

In some embodiments, mobile computing device 200 can also use accessory I/O interface 205 to communicate with a host computer (not shown) that executes an asset management program that can provide media and/or applications for a mobile computing device (for example, iTunes® or Microsoft's application store). The asset management program can enable a user to add media assets and/or applications to mobile computing device and/or remove media assets from mobile computing device 200. The user can update metadata associated with media assets on mobile computing device 200. In some embodiments, the user can also interact with the asset management program to create and update playlists and/or applications as well as other documents. In one embodiment, the host computer maintains a master database of media assets and/or applications and can access other databases, for example, through the Internet (including associated metadata and playlists), and the asset management program synchronizes the master database with the database maintained on storage device 225 of mobile computing device 200 automatically whenever mobile computing device 200 connects to the host computer. In other embodiments, mobile computing device 200 can use network interface 236 to communicate with a host computer and/or directly with various other servers to acquire applications, media assets and/or other data.

Accessory 202 can include controller 260, user interface 255, mobile computing device I/O interface 250, memory 265, and accessory specific hardware 275.

Mobile computing device I/O interface 250 can include a number of signal paths configured to carry various signals between accessory 202 and mobile computing device 200. In one embodiment, mobile computing device I/O interface 250 can include a connector adapted to mate with the 30-pin connector used on iPod® and iPhone™ products manufactured and sold by Apple Inc. Other connectors can also be used; for example, mobile computing device I/O interface 250 can include a standard USB or FireWire connector or the like. Alternatively or additionally, mobile computing device I/O interface 250 can include a wireless interface (e.g., Bluetooth or the like).

Controller 260 can include, e.g., a microprocessor or microcontroller executing program code to perform various functions such as digital audio decoding, analog or digital audio and/or video processing, processing of user input, controlling of accessory functionality and the like. Controller 260 can also manage communication with a mobile computing device via mobile computing device I/O interface 250.

User interface 255 can include input controls, such as a touch pad, touch screen, scroll wheel, click wheel, dial, button, keypad, microphone, probes, etc., as well as output devices, such as a video screen, indicator lights, speakers, headphone jacks or the like, together with supporting electronics (e.g., digital-to-analog or analog-to-digital converters, signal processors or the like). A user can operate the various input controls of user interface 255 to invoke the functionality of accessory 202 and can view and/or hear output from accessory 202 via user interface 255. In addition, in some embodiments, a user can operate mobile computing device 200 (or applications executing thereon) via accessory user interface 255.

Memory 265 can be implemented using any type of memory, disk, or other storage medium that can store program code for controller 260 and/or data. For example, memory 265 can store accessory specific software 280 that can provide instructions for controller 260 to interact with accessory specific hardware 275, and/or user interface 255. In some embodiments, accessory 202 can receive information (e.g., user input, metadata, and/or application data) from mobile computing device 200, and such information can also be stored in memory 265.

Accessory specific hardware 275 can represent any hardware needed to enable desired functionality of accessory 202. For example, accessory specific hardware 275 can include one or more data gathering devices, such as any type of sensor or meter. In some embodiment, accessory specific hardware 275 can include an electrical meter that generates data representing electrical characteristics (resistance, voltage difference, or the like); a light sensor that detects light and/or patterns of light; a motion sensor; a temperature sensor; a humidity sensor; a pressure sensor; a chemical sensor that responds to the presence of selected chemicals (e.g., potentially toxic gases such as carbon monoxide); and so on. Accessory specific hardware 275 can also include one or more medical device such as a glucose meter, respiratory meter, heart rate and/or heart function monitor, blood pressure monitor, or the like.

In some embodiments, accessory specific hardware 275 that includes a data-gathering device can provide one or more electrical signals (e.g., voltage, resistance, and/or current) that correspond to or represent the physical data. Analog and/or digital signals in a variety of formats may be used. Accessory specific hardware 275 can also include signal processing components that process the signal before sending it to controller 260; in some embodiments, accessory specific hardware 275 can send the electrical signal directly to controller 260, which can process the signal. For example, if accessory specific hardware 275 includes a thermometer implemented using a thermocouple, resistance data from the thermocouple can be converted into temperature data by accessory specific hardware 275, by controller 260, or both. Further, signals representing data gathered by accessory specific hardware 275 can be sent (with or without processing by controller 260) to an application executing on mobile computing device 200, e.g., using an application protocol as described below; thus an application executing on mobile computing device 200 can also process data gathered using accessory specific hardware 275.

In some embodiments, accessory specific hardware 275 can include one or more computer-controllable devices. Examples of computer-controllable devices include motors, actuators, lights, cameras, valves, speakers, display screens, printers, and/or any other equipment that is controllable by controller 260. In some embodiments, an application executing on mobile computing device 200 can send control signals to accessory 202, and controller 260 can operate accessory specific hardware 275 in response to the control signals.

In some embodiments, accessory specific hardware 275 can include components of user interface 255. Thus, an application executing on mobile computing device 200 can receive user input from accessory 202, provide output to a user via accessory 202, and/or control, interact with, or respond to any operation accessory 202 is capable of performing.

In some embodiments, accessory specific hardware 275 can include network and/or communication interfaces. For example, accessory specific hardware 275 can include an RF receiver (e.g., for FM, AM, satellite radio, and/or other bands) and/or an RF transmitter (e.g., a short-range transmitter for personal use). In other embodiments, accessory specific hardware 275 can include a communication interface to a personal area network, such as a Bluetooth transceiver or other short-range wireless communication interface. In still other embodiments, accessory specific hardware 275 can include a telephone interface, GSM, CDMA, and/or other voice and/or data network interfaces.

Accordingly, accessory specific hardware 275 can encompass any hardware component for which interoperability with a mobile computing and/or communication device may be desirable.

It will be appreciated that the system configurations and components described herein are illustrative and that variations and modifications are possible. The mobile computing device and/or accessory may have other capabilities not specifically described herein. While accessory 202 and mobile computing device 200 are described herein with reference to particular blocks, it is to be understood that the blocks are defined for convenience of description and are not intended to imply a particular physical arrangement of component parts. Further, the blocks need not correspond to physically distinct components.

Accessory I/O interface 205 of mobile computing device 200 and mobile computing device I/O interface 250 of accessory 202 allow mobile computing device 200 to be connected to accessory 202 and subsequently disconnected from accessory 202. As used herein, mobile computing device 200 and accessory 202 are "connected" whenever a communication channel between accessory I/O interface 205 and mobile computing device I/O interface 250 is open and are "disconnected" whenever the communication channel is closed. Connection can be achieved by physical attachment (e.g., between respective mating connectors of mobile computing device 200 and accessory 202), by an indirect attachment such as a cable, or by establishing a wireless communication channel. Similarly, disconnection can be achieved by physical detachment, disconnecting a cable, powering down accessory 202 or mobile computing device 200, or closing the wireless communication channel. Thus, a variety of communication channels may be used, including wired channels such as Universal Serial Bus ("USB"), FireWire (IEEE 1394 standard), or universal asynchronous receiver/transmitter ("UART"), or wireless channels such as Bluetooth (a short-range wireless communication standard developed by the Bluetooth SIG and licensed under the trademark Bluetooth®), WiFi (adhering to any of the IEEE 802.11 family standards), wireless personal area network, infrared, or the like. In some embodiments, communication can occur using both a wired and a wireless channel. In some embodiments, multiple communication channels between a mobile computing device and an accessory can be open concurrently, or a mobile computing device can be concurrently connected to multiple accessories, with each accessory using a different communication channel.

Regardless of the particular communication channel, as long as mobile computing device 200 and accessory 202 are connected to each other, the devices can communicate by exchanging commands and data as specified by an accessory communication protocol. The accessory communication protocol can define a format for sending messages between mobile computing device 200 and accessory 202. For instance, the accessory communication protocol may specify that each message is sent in a packet with a header, a payload, and/or a tail. The header can provide basic information such as a start indicator, length of the packet, and a command to be processed by the recipient, while the payload provides any data associated with the command; the amount of associated data can be different for different commands, and some commands may provide for variable-length payloads. The packet can also include a tail that may provide error-detection or error-correction codes, e.g., as known in the art, and/or other information as desired. In various embodiments, the accessory communication protocol can define specific commands to indicate an action to be taken by the recipient; to signal completion of a task, change of state, or occurrence of an error; and/or to identify the nature of the associated data. In some embodiments, the commands may be defined such that any particular command is valid in only one direction.

The accessory communication protocol can also specify one or more physical transport links usable for transmitting signals between devices. For example, the transport link can be a USB link, a UART link, a FireWire link, a Bluetooth link, a WiFi link, a parallel link, a serial link, etc. At this level, the accessory communication protocol can specify, e.g., start bytes, sync bytes, stop bytes, and/or other auxiliary signals. In some embodiments, the accessory communication protocol can provide for multiple alternative transport links; thus a single mobile computing device can support communication over a variety of physical links including wired and/or wireless links.

The accessory communication protocol can define a number of "lingoes," where a "lingo" refers generally to a group of related commands that can be supported (or unsupported) by various classes of accessories. In one embodiment, a command can be uniquely identified by a first byte identifying the lingo to which the command belongs and a second byte identifying the particular command within the lingo. Other command structures may also be used. It is not required that all accessories, or all mobile computing devices to which an accessory can be connected, support every lingo defined within the accessory communication protocol or every command of a particular lingo (for instance, different devices might use different versions of a given lingo).

In some embodiments, every accessory 202 and every mobile computing device 200 that are designed to interoperate with each other support at least a "general" lingo that includes commands common to all such devices. The general lingo can include commands enabling the mobile computing device and the accessory to identify themselves to each other and to provide at least some information about their respective capabilities, including which (if any) other lingoes each supports and which capabilities of the other device each intends to use while connected.

The general lingo can also include authentication commands that the mobile computing device can use to verify the purported identity and capabilities of the accessory (or vice versa), and the accessory (or mobile computing device) may be blocked from invoking certain commands or lingoes if the authentication is unsuccessful. For example, an authentication manager (not shown) within mobile computing device 200 can communicate with an authentication controller (also not shown) within accessory 202 to perform an authentication procedure, e.g., based on public key cryptography and a store of digital certificates maintained within the authentication manager of mobile computing device 200.

The general lingo or another lingo of the accessory communication protocol can also include "tunnel" commands that allow an exchange of arbitrary information between an application 226 executing on mobile computing device 200 and accessory 202. For example, a TunnelToAcc command can be defined as being sendable by mobile computing device 200 to accessory 202. The payload of this command can be any data, control signals, or other information that an application 226 executing on mobile computing device 200 can generate and send to accessory 202. Similarly, a TunnelToHost command can be defined as being sendable by accessory 202 to mobile computing device 200. The payload of this command can be any data, control signals, or other information that accessory 202 can generate and send to an application 226 executing on mobile computing device 200. These tunnel commands can be defined such that the accessory communication protocol is agnostic as to the payload content. Examples of techniques for managing communication such that a particular application sends data, control signals or other information only to accessories capable of processing it (and vice versa) are described below.

In some embodiments, the accessory can communicate with an API associated with one or more applications at the mobile computing device using the application communication protocol. For example, such communication can use the "tunnel" command discussed above. In some embodiments, the accessory can communicate with an API associated with one or more application using the accessory communication protocol. In other embodiments, the accessory can also communicate with the mobile computing device operating system using either or both of the accessory communication protocol and/or the application communication protocol. Thus, embodiments disclosed herein can be used to facilitate communication from an accessory to an application, API, and/or an operating system at the mobile computing device using either or both of an application communication protocol and/or an accessory communication protocol.

An accessory communication protocol supported by a mobile computing device and an accessory can include various other lingoes, such as a simple remote lingo that allows the accessory to send a command indicating a function of the mobile computing device to be invoked, a remote user interface lingo that can be used to communicate commands and data related to replicating all or part of a user interface of the mobile computing device on the accessory (thereby supporting a more advanced remote control), a tuner lingo that allows a user to control a tuner accessory by operating the mobile computing device, a storage lingo that allows the accessory to store data on the mobile computing device, and so on. Any lingo or combination of lingoes or other commands or groups of commands can be used in connection with embodiments described herein.

It will be appreciated that the accessory communication protocol described herein is illustrative and that variations and modifications are possible. Specific commands described herein can be replaced with other commands or combination of commands or other types of messages and formats. In addition, it is not required that all of the commands and operations described herein be supported by any particular mobile communication device or accessory.

As noted above, application 226 executing on mobile computing device 200 and accessory 202 can exchange arbitrary data, control signals, and/or other information (also referred to herein as "messages"). These messages can relate to a wide variety of circumstances. For example, messages relating to user input events, detected external conditions, received data or any other events or conditions that may occur at mobile computing device 200 can be communicated to accessory 202. Conversely, messages relating to user input events, detected external conditions, received data or other events or conditions that may occur at accessory 202 can be communicated to mobile computing device 200.

For example, in some embodiments, mobile computing device 200 can process input events from a user, for example, through user interface 255, such as touch screen events, button presses, scroll wheel events, etc. Mobile computing device 200 can provide data representative of input events to an application running on mobile computing device 200, to accessory 202, or to both. Accessory 202 can interpret such data as input for controlling, for example, accessory specific hardware 275 and/or for processing at controller 260. For example, touch screen data can be collected by mobile computing device 200 for use by an application, accessory 202, or both; in some embodiments, touch screen data can include data representing taps and/or movements such as swipes, pinches, drags, and other gestures. In some embodiments, touch screen data can be sent in raw data format (e.g., a sequence of coordinates representing where pressure corresponding to a finger movement was detected). In other embodiments, touch screen data can be converted into processed data, such as gesture events (e.g., a tap, a swipe or drag from one point to another, a pinch, etc.) prior to being sent to an accessory. In some embodiments, raw keyboard data can be sent to an accessory and/or processed keyboard data can be sent to an accessory. In some embodiments, some or all types of user input data can be communicated to accessory 202 using an application and application protocol, e.g., as described below; in other embodiments, some or all types of user input data can be communicated using the accessory communication protocol to whatever extent the accessory communication protocol supports sending user input data of a particular type.

Mobile computing device 200 can also send information other than user input to accessory 202. For example, in some embodiments mobile computing device 200 can include various sensors and/or data gathering devices in addition to user input devices; examples can include accelerometers, gyroscopes, compass, location-determining devices (e.g., a Global Positioning System receiver or telephonic triangulation system), light sensors, infrared sensors, camera, network interfaces (e.g., telephone, WiFi, Bluetooth), or the like. Mobile computing device 200 can provide any or all of this data to accessory 202, e.g., in response to a specific request from accessory 202. In some embodiments, some or all of this data can be communicated to accessory 202 using an application and application protocol, e.g., as described below; in other embodiments, some or all of this data can be communicated using the accessory communication protocol to whatever extent the accessory communication protocol supports sending information of a particular type.

In another example accessory 202 can receive input events from mobile computing device 200. Such events can correspond to user input and/or other data detected at mobile computing device 200, including but not limited to any of the data types described above. In some embodiments, such input events can be processed by controller 260 at accessory 202 to control accessory specific hardware 275. For example, touch screen or other user input events at mobile computing device 200 can be sent to accessory 202 to turn on, change the state of, receive data from, provide data to, turn off, and/or set settings for, accessory specific hardware 275. Touch screen data, for example, can be sent in raw data format or as interpreted events (e.g., press, swipe, pinch). In some embodiments, accessory specific software 280 can include instructions to receive and/or interpret raw touch screen data. In some embodiments, accessory specific software 280 can include instructions to translate raw touch screen data into commands and/or controls for accessory specific hardware 275. In another embodiment, the touch screen data can be provided in raw format to an application executing on mobile computing device 200, which can interpret the data and send corresponding commands and/or information to accessory 202.

Moreover, input events received at accessory 202 from mobile computing device 200 can be processed by controller 260 executing accessory specific software 280. In some embodiments, accessory specific software 280 can interact with accessory specific hardware 275 in response to input events received from mobile computing device 200.

Further, in some embodiments, accessory specific hardware 275 can also be controlled by mobile computing device 200 via a connection with accessory 202. For example, an application executing on mobile computing device 200 can include program code that when executed by processor 230, can control, interface with, interoperate with, and/or receive signals from the accessory specific hardware 275 at accessory 202. In some embodiments, the application executing on mobile computing device 200 can exchange messages with a control program executing on controller 260 of accessory 202, thereby instructing controller 260 to communicate with and/or control operation of accessory specific hardware 275. Such messages can be exchanged using an application protocol, e.g., as described below.

In some embodiments, accessory specific hardware 275 can provide input data to controller 260. For example, accessory specific hardware 275 can include a measurement sensor that can convert physical characteristics into data (or electronic signals representing data; the terms are used interchangeably) that can be sent to controller 260 and/or stored in memory 265. Controller 260 can process the data (e.g., applying calibration corrections, reducing noise, and/or other data-processing operations). The processed data can be sent from accessory 202 to mobile computing device 200. At mobile computing device 200 an application can further process the data and/or provide the data to a user through the user interface. Moreover, the application can perform any number of functions in response to the data.

In some embodiments, an accessory and an application can exchange any messages desired, where the term "message" refers generally to any type of control signal, event, data, status or configuration information or any other type of information available to the sender. To facilitate exchange of messages, an accessory and an application can use a mutually agreed-upon application protocol. The application protocol can specify a universe of accepted formats for messages that can be exchanged. Devices or programs adhering to a particular application protocol can structure the messages they send in accordance with the application protocol's universe of accepted formats and can interpret messages they receive in accordance with the application protocol's universe of accepted formats. For instance, in the case of binary digital communication, the application protocol can specify how the bits comprising the message are to be interpreted by the recipient. Thus, like the accessory communication protocol, an application protocol can specify packet structures; commands; lingoes; payload formats; and/or other formats, data structures, semantics or rules of interpretation such that a particular message sent by one participant will be correctly interpreted by the recipient. Indeed, in some embodiments, portions of the accessory communication protocol can be directly adopted as all or part of an application protocol for a particular accessory and/or application.

In certain embodiments described herein, accessory protocol messages can be sent between devices by encapsulating, wrapping, or packaging the messages within packets conforming to the accessory communication protocol, e.g., using tunneling commands as described above. Thus, the transport link specified by the accessory communication protocol can be used, and it is not necessary for an application protocol to specify a physical transport link.

It is contemplated that an unlimited range of accessories and applications that use a variety of different application protocols can be created for use with a particular mobile computing device (or line of mobile computing devices). In some embodiments, mobile computing device 200 can be configured with application protocol management capability (e.g., using an application manager) that includes tracking the application protocol(s) used by each connected accessory and the application protocol(s) used by each executing and/or installed application. For example, mobile computing device 200 can provide system services to facilitate identifying an appropriate application to be used with a particular accessory and/or identifying whether a suitable accessory is available for a particular application. These services can be provided without requiring the system services of mobile computing device 200 to implement or communicate according to any application protocol.

Figure 3:
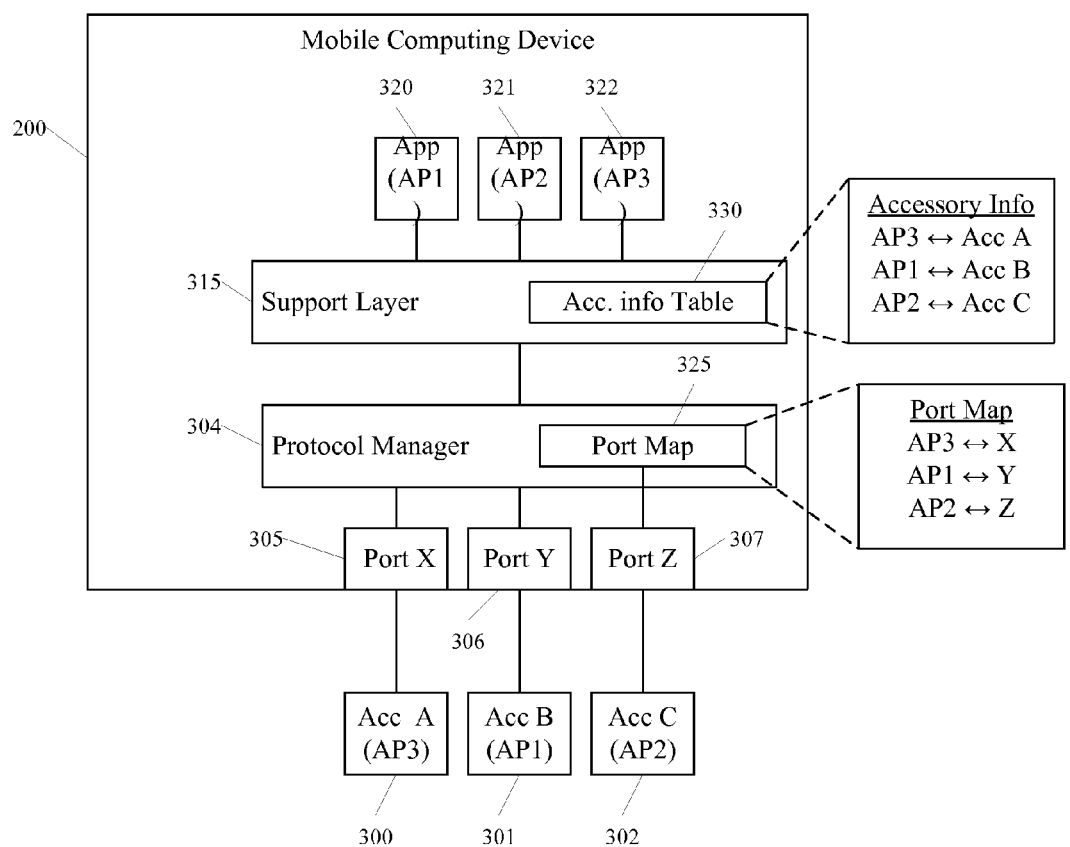
FIG. 3 is a block diagram showing various modules and processes within a mobile computing device according to some embodiments of the invention.

FIG. 3 is a block diagram showing various modules and processes within mobile computing device 200 according to an embodiment of the present invention. The various modules shown can correspond to programs executing on processor 230 of FIG. 2, programs executing on other processors within mobile computing device 200, application-specific integrated circuits, or other implementations. In some embodiments, multiple processor chips or multiple processor cores within a single chip can be used to implement the various modules and processes described herein. Some or all of the processors can be programmable general-purpose processors executing software and/or firmware programs; others can be digital signal processors, state machines with built-in functionality, or any combination thereof Ports 305-307 provide communication channels for accessories 300-302 respectively. Each of ports 305-307 can be a physical and/or logical port supporting a specific communication channel. For example, port 305 can be a physical port associated with a wired channel such as USB or UART and can incorporate hardware elements (e.g., USB-compatible driver circuits and/or pins) along with suitable control software. Port 306 can be a logical port (e.g., a virtual serial port)

associated with a wireless channel such as Bluetooth. In some embodiments, each port 305-307 can send and receive messages conforming to the accessory communication protocol as applied to the particular physical transport or channel associated with that port. While three ports are shown, it is understood that a mobile computing device can be designed to support any number of physical and/or logical ports in any combination. Further, as described below, a single accessory can connect to multiple ports in some embodiments.

Protocol manager 310, which can be, e.g., a firmware or software module executed by processor 230, can receive mobile computing device-protocol messages (also referred to as commands) from ports 305-307 and begin the process of interpreting the messages. In some embodiments, protocol manager 310 or an associated protocol daemon (not shown) associated with protocol manager 310 can also create or define ports 305-307 and connect them to suitable communication hardware, such as connector pins and driver circuits, wireless transceivers, etc. In one embodiment, protocol manager 310 (or its associated protocol daemon) can extract inbound mobile computing device-protocol messages received on the various ports and deliver the extracted messages to support layer 315 or to other components within mobile computing device 200. Thus the upper levels of the process stack of FIG. 3 can be independent of a particular transport link.

In another embodiment, protocol manager 310 can receive outbound information (e.g., a message that has been structured according to an application protocol by application 404 that created the message) intended for a connected accessory (e.g., any of accessories 300-302) from support layer 315, package the outbound message into a mobile computing device-protocol packet, and deliver the packet to the one of ports 305-307 that is connected to the desired accessory.

In some embodiments, protocol manager 310 (or an associated protocol daemon) can also support and/or control opening and closing of ports. For example, in the case of a virtual port, protocol manager 310 can create a set of virtual ports at startup and open and/or close the ports as connections are requested and/or terminated.

Protocol manager 310 can maintain a dynamic port map 325 that associates specific application protocols with specific ports. For example, when an accessory such as accessory 300 establishes a connection to mobile computing device 200 on a particular port such as port 305, accessory 300 can identify the application protocol(s) it supports (e.g., AP3 in the case of accessory 300) to protocol manager 310, e.g., by providing a protocol name string via port 305. Protocol manager 310 can store an association between the application protocol name and the port in port map 325. When the accessory is subsequently disconnected, the association can be removed from port map 325. Thus, port map 325 can provide a list of application protocols that are currently available for use by applications. As described below, such a list facilitates routing of communications between accessories and applications, as well as notifying compatible applications when compatible accessories are connected.

Software support layer 315 can act as an intermediary between protocol manager 310 (and optionally other low-level device functions) and applications 320-322 that can be executed on mobile computing device 200. For example, software support layer 315 can provide an application program interface (API) via which applications can invoke device functionality. Software support layer 315 can provide an extra level of device independence to applications 320-322; however, those skilled in the art will appreciate that not all layers shown in FIG. 3 are required. For instance, in some embodiments, protocol manager 310 can communicate directly with applications 320-322.

In the embodiment shown, support layer 315 can provide accessory information lookup table 330. In one embodiment, accessory information table 330 can include information about each connected accessory such as accessory type, accessory identifier, and/or the name(s) of one or more application protocols supported by the accessory. Accessory information table 330 can be populated and updated in response to information provided by protocol manager 310 as accessories connect and disconnect.

Applications 320-322 can be concurrently or sequentially executing applications and can be implemented as program code executable, e.g., by processor 230. Various applications 320-322 can provide various forms of user interaction with mobile computing device 200 and/or connected accessories 300-302. For example, an application can provide a user interface to a connected measurement probe accessory. In response to user input, the application can instruct the measurement probe to begin recording measurement data and stop recording measurement data. The application can also present measurement data to a user. The application can convert data into various forms and/or provide further user interactions, such as viewing a record of measurements over time, performing analysis operations on the data (e.g., averaging, trend analysis, graphical analysis, or the like), and so on.

An executing application (e.g., any of applications 320-322) can query accessory information table 330 at any time to determine whether a compatible accessory (i.e., an accessory that supports an application protocol used by the application) is connected. If a compatible accessory is connected, the application can communicate with the accessory using the application protocol. For example, as described below, the application can initiate a communication session with the accessory.

It will be appreciated that the modules described herein are illustrative and that variations and modifications are possible. Mobile computing device 200 can support any type of application, and applications can be launched or exited under control of a user or another process. Certain modules, such as support layer 315 and protocol manager 310, can be implemented in software and/or firmware and configured to be automatically started at device power-up and to terminate only on power down or when various abnormal conditions are detected; applications 320-322 may start and terminate in response to user input or other input. In some embodiments, an application may automatically be launched when a corresponding accessory is connected, e.g., as described below. The various modules or processes may go into inactive states to minimize resource consumption when not in use. Further, not all of the layers and modules shown herein are required; for instance, in some embodiments, applications might communicate directly with the protocol manager, bypassing support layer 315. In other embodiments, modules or layers shown as separate in FIG. 3 can be combined, or additional modules or layers can be provided, such as the protocol daemon and/or modules associated with various system services of mobile computing device 200 (e.g., audio and/or video playback, network connections, and the like).

It is also to be understood that an accessory can implement modules, layers, and other components similar to those shown in FIG. 3, or any variation or modification thereof. As long as the accessory is capable of exchanging information with a mobile computing device according to an accessory communication protocol, the internal implementation can be varied as desired.

As shown in FIG. 3, mobile computing device 200 in some embodiments can maintain multiple concurrently executing applications 320-322 and/or concurrent connections to multiple accessories 305-307. The applications and/or accessories can support different (and potentially incompatible) application protocols, and each application protocol can be assigned a name (e.g., a unique string) to distinguish it from all other application protocols. For example, in the embodiment of FIG. 3, application 320 and accessory 301 support application protocol AP1; application 321 and accessory 302 support application protocol AP2; and application 322 and accessory 300 support application protocol AP3.

It is contemplated that third parties will be able to independently develop applications and/or accessories. If two accessories (or applications) associate the same accessory protocol name with application protocols that are in fact not compatible, this can create a name conflict, e.g., if both accessories attempt to connect to the same mobile computing device concurrently. To avoid such conflicts, it may be desirable to provide centralized namespace management for application protocol names. In some embodiments, a central namespace manager (e.g., the manufacturer of the mobile computing device) can assign names to application protocols upon request from developers thereof. In another embodiment, the central namespace manager can simply define a naming convention that, if adhered to, should prevent name conflicts, and developers of accessories and/or applications can avoid conflicts by adhering to the convention.

In one embodiment, a reverse domain name convention is adopted for managing the application protocol namespace. Conventional domain names provide, from left to right, lower level domains to top level domains. For example, in the domain name: "help.example.com", the term "com" is the top level domain and the term "example" is a lower level domain, and the term "help" is the lowest level domain. As another example, the domain name "mac.apple.com" from left to right specifies the lowest level domain "mac", the middle domain "apple", and the top level domain "com". Reverse domain names, on the other hand, would provide "com.apple.mac".

The reverse domain name convention can be used to specify application protocols used by a specific company. That is, the reverse domain name "com.company1.accessory1" specifies that the "accessory1" protocol is associated with the company (or other developer) "company1". Thus, in general, a company can implement a protocol using the reverse domain name convention, where the first portion of the reverse domain name references the company ("com.company1") and is associated with the company's (or other developer's) Internet domain name. The second portion of the reverse domain name ("accessory1") specifies a specific protocol. To the extent that the different developers of accessories and/or applications are associated with different Internet domain names, a reverse domain name convention allows developers to distinguish applications and/or protocols and/or accessories from others by naming their protocols based on the reverse of their Internet domain name. This convention allows developers to independently name their protocols without concern for the naming conventions of other developers. Moreover, if there is a conflict between two developers using the same names, a simple check of who owns the corresponding Internet domain name should determine which developer has rights to a particular reverse domain name.

In some embodiments, reverse domain names can be appended to include a global identifier that is specific to all devices in a class of devices. For instance, all serial pass through type devices can include an identifier appended to the reverse domain name. For example, such a reverse domain name may have the following format: "com.company1.accessory1.serialpass" or "serialpass.com.company1.accessory1." With such a convention, different companies can produce serial pass through devices and yet the mobile computing device can recognize such devices despite manufacturer differences. This reverse domain name convention is only one example of how application protocols can be identified. Any type of convention can be used.

Accordingly, when an accessory is connected with a mobile computing device, the accessory can provide the mobile computing device with a list of its supported application protocols by supplying the name that was assigned to each supported protocol using the reverse domain name convention. An accessory can support a single application protocol or multiple application protocols. Based on the received information, mobile computing device 200 of FIG. 3 can populate port map 325, accessory information table 330 and/or other lookup tables with information such as accessory type, accessory identifier, application protocol name, and/or communication port identifier. As described below, applications 320-322 can use these lookup tables to determine whether a compatible accessory is available, and support layer 315 and/or protocol manager 310 can use the lookup tables to route communications without having to understand any of the application protocols.

For example, mobile computing device 200 can be wirelessly connected with a thermometer and also connected with a camera using a cable. (For instance, in FIG. 3, accessory 302 can be a thermometer and port Z a wireless port while accessory 300 can be a camera and port X a wired port.) Upon connection, the thermometer can identify its supported application protocol by sending the reverse domain name "com.temprus.thermometer1". This reverse domain name can be sent to the mobile computing device using the accessory communication protocol. At the mobile computing device, this reverse domain name can be stored as an application protocol name in a lookup table (e.g., port map 325 and/or accessory information table 330); in some embodiments, the reverse domain name can be stored in conjunction with an accessory identifier for the thermometer and/or the wireless port where the thermometer can be accessed. Similarly, upon connection, the camera can identify its supported application protocol by sending the following reverse domain name "com.camerasrus.camera1", again using the accessory communication protocol. This reverse domain name can also be stored in the lookup table (e.g., port map 325 and/or accessory information table 330), e.g., in conjunction with an accessory identifier for the camera and/or the port where the camera can be accessed.

Mobile computing device 200 can execute a temperature application (e.g., application 321) that communicates with a thermometer using the application protocol "com.temprus.thermometer1" to make temperature readings. During execution, the temperature application can access the lookup table to see if a compatible application protocol is present, e.g., by searching for the protocol name "com.temprus.thermometer1". When the temperature application finds "com.temprus.thermometer1", the application has a match and can begin communicating with the thermometer using the com.temprus.thermometer1 application protocol. The communication is routed through the associated port, e.g., by using tunneling commands of the accessory communication protocol. The application protocol can specify commands, packet information, data, etc., that can be different from what is specified in the accessory communication protocol. Moreover, the company providing the application and/or the accessory (for example, the TempRUs company) can implement any communication protocol for communication between applications and accessories.

Figure 4:
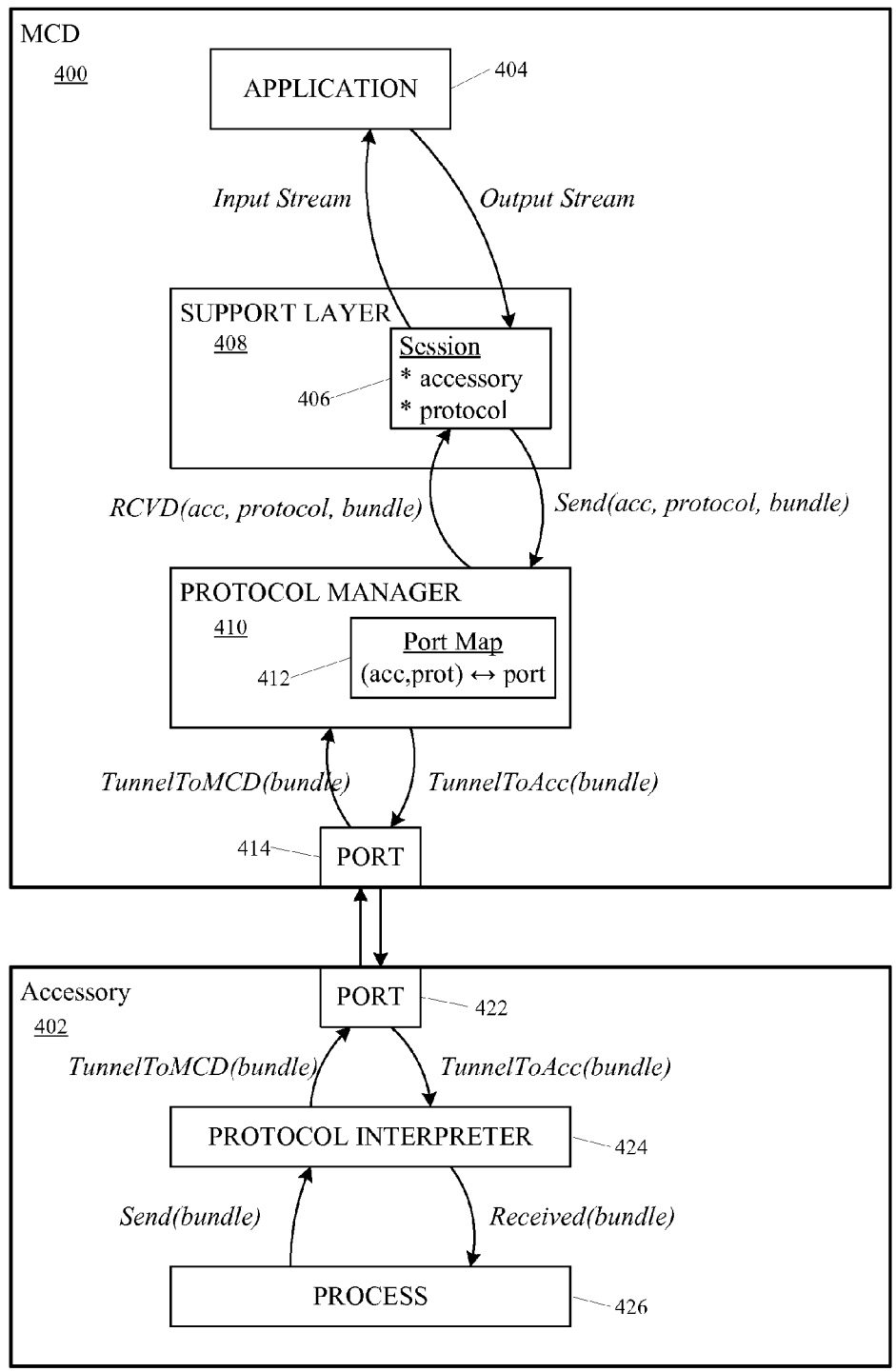
FIG. 4 is a simplified diagram further illustrating communication between an application and an accessory according to some embodiments of the invention.

FIG. 4 is a simplified diagram further illustrating communication between an application and an accessory according to some embodiments of the invention. Mobile computing device 400 can be connected to accessory 402, allowing application 404 executing on mobile computing device 400 to communicate with accessory 402 using an application protocol.

In the embodiment shown in FIG. 4, application 404 has already determined that accessory 402 is a compatible accessory and has created a session 406 by invoking appropriate function calls to support layer 408. Session 406 can be, e.g., a software object created by application 404 using an API call to support layer 408. Session 406 can be associated with the application 404 that created it as well as a particular accessory and/or application protocol specified by application 404 when it creates the session. Session 406 can provide, among other things, an input stream and an output stream whose contents are, respectively, received from and delivered to application 404. (Creation of a session is described below.)

To communicate a message (e.g., control signals and/or other information) to accessory 402 using the application protocol, application 404 generates the message and writes it as data to an output stream of session 406. In this embodiment, application 404 is solely responsible for formatting the message in accordance with the application protocol; other intermediary processes on mobile computing device 400 do not alter the data that is written to the output stream.

Session 406 detects the presence of data in the output stream and sends a corresponding send (SND) instruction to protocol manager 410. The SND instruction provides the accessory and accessory protocol identifiers associated with session 406 and a "bundle" that represents data from the output stream. In some embodiments, the bundle can correspond to all of the message data; however, depending on the length of the message and constraints that might be imposed on packet length by the accessory communication protocol, a bundle may also correspond to only a portion of the message data. Conversely, in some embodiments, a single bundle might include multiple application protocol messages.

Protocol manager 410 can use the accessory and accessory protocol identifiers provided by session 406 along with port map 412 to select a port for transmission of the bundle. Protocol manager 410 can also package the bundle within a command of the accessory communication protocol, e.g., a TunnelToAcc command as described above. The accessory communication protocol command is sent to port 414 for transmission. (While only one port is shown in FIG. 4, it is understood that mobile computing device 400 can have multiple ports.)

Figure 5A:
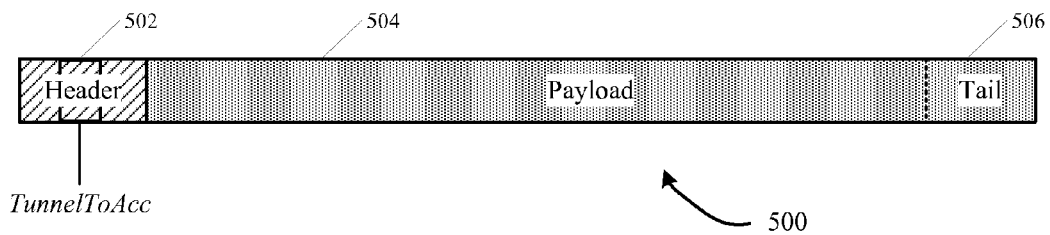
FIGS. 5A-5C illustrate an example of packaging an application protocol message within an accessory communication protocol command according to some embodiments of the invention.
Figure 5B:
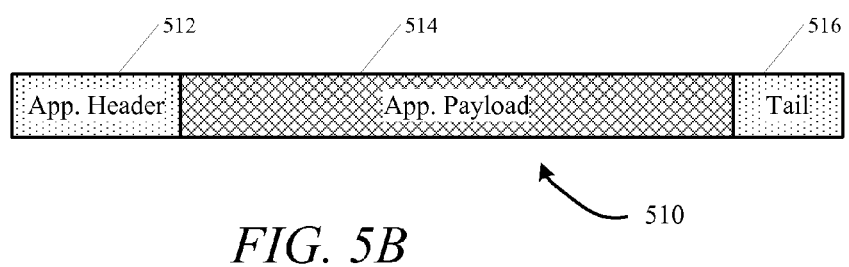
Figure 5C:
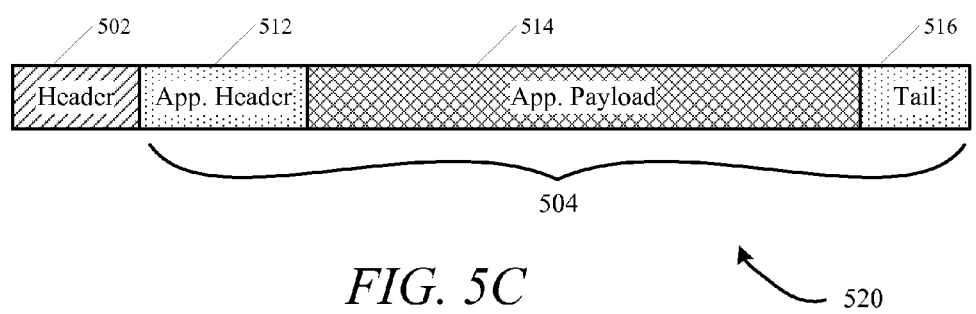

FIGS. 5A-5C illustrate an example of packaging (or wrapping) an application protocol message within an accessory communication protocol command according to some embodiments of the invention. FIG. 5A shows an example of an accessory protocol packet 500. As shown, packet 500 includes header 502 and payload 504. The accessory communication protocol, for example, can dictate the size of the header and what information can be provided within header 502. In some embodiments, header 502 can include a command or byte code that can indicate what is contained in the payload and/or what is to be done with data in the payload. For example, in the embodiment shown, header 502 includes a command code for the TunnelToAcc command. Header 502 can also include other information, such as information specifying the size of payload 504. In some embodiments, an optional tail 506 can be included at the end of packet 500; the tail can include information usable to detect or correct errors (e.g., a checksum) and/or other information as desired. Those skilled in the art will recognize that various packet types can be used in the accessory communication protocol.

FIG. 5B shows an example of an application protocol packet 510. Application protocol packet 510, in this example, includes a header 512 (App. Header), payload 514 (App. Payload), and tail 516. Various other packet types, styles, configurations, payloads, information regions, etc., can be used in an application protocol packet. Indeed, applications and/or accessories can use application protocol packet of any type, size, configuration, etc., as designed, developed and/or created by application developers without limitation; in some embodiments, some or all application protocol packets may be modeled on (or even indistinguishable by content from) accessory communication protocol packets. In some embodiments, an application protocol packet may or may not include a header. In some embodiments, application protocol packet may or may not include a tail. In some embodiments, an application protocol packet can include a payload 514 with a fixed or variable size. In some embodiments, commands, data, and/or other message elements can be provided within the payload and/or the header. The specific characteristics of the commands and/or data and/or other message elements can be specified by the application protocol. Further, application protocols are not required to use a packet structure for messages at all; accessory protocol messages can have any format and/or structure that is capable of being correctly interpreted by the recipient.

FIG. 5C shows an example an application protocol packet 510 packaged (or wrapped) within payload 504 of accessory protocol packet 520. As shown, packet 520 can include accessory protocol packet header 502 followed by application protocol packet 510. In some embodiments, header 502 can include a command or byte code indicating that the payload is an application protocol packet. The application protocol packet, in this example, includes an application protocol packet header 512, application protocol packet payload 514, and application protocol packet tail 516. Application protocol packet 510 may or may not completely fill payload 504 of accessory protocol packet 520. More generally, an accessory protocol packet for a TunnelToAcc command can include any data bundle intended for delivery to the accessory and is not limited to carrying a single accessory protocol packet.

Referring again to FIG. 4, accessory 402 receives the accessory protocol TunnelToAcc command packet, e.g., at port 422. Port 422 can route the TunnelToAcc command packet to a protocol interpreter 424, which can be, e.g., a software process executing on a controller or other processor of accessory 402. Protocol interpreter 424 can read the TunnelToAcc command, extract the bundle contained therein, and forward the bundle to another process 426 executing on a controller or other processor of accessory 402. Process 426 can include any process that is capable of processing received information conforming to the application protocol. For instance, process 426 can include a process that extracts instructions from the received information and generates corresponding control signals for accessory-specific hardware (e.g., accessory specific hardware 275 of FIG. 2).

Communication from accessory 402 to mobile computing device 400 is also supported. For example, process 426 can generate a data bundle corresponding to a message in the application protocol and provide the bundle to protocol interpreter 424 to be sent to mobile computing device 400. Protocol interpreter 424 can package the bundle inside a TunnelToHost command of the accessory communication protocol (e.g., similarly to the example shown in FIGS. 5A-5C) and send the command to port 422 for transmission to mobile computing device 400.

At mobile computing device 400, port 414 receives the TunnelToHost command packet and forwards it to protocol manager 410. Protocol manager 410 recognizes the TunnelToHost command and in response thereto, extracts the bundle and forwards it to support layer 408, along with identification of the accessory and application protocol associated with the bundle. In some embodiments, protocol manager 410 can determine these identifiers based on which port delivered the TunnelToHost command; thus, the TunnelToHost command need not provide identification of the accessory or application protocol.

Support layer 408 uses the accessory and accessory protocol identifiers to direct the bundle to the input stream of session 406. Application 404 can then read the incoming data from the input stream of session 406, interpret the data according to the application protocol and respond accordingly.

Thus, for example, application 404 can be a thermometer application, and accessory 402 can include a thermometer. Application 404 can request a temperature measurement from accessory 402 using an appropriate application protocol (e.g., a protocol named "com.temprus.thermometer1"). The application protocol, for example, can specify a Get_Temp command that is sent by the application to request temperature data from the accessory. Application 404 can create an application protocol packet that includes, e.g., the Get_Temp command and any preferences or variables associated with the command (e.g., whether to return the temperature data in Fahrenheit or Celsius). Application 404 can create a packet with the proper header and/or tail as defined by the application protocol. Application 404 can then pass this packet as an application protocol message into the output stream of session 406. Session 406 can direct protocol manager 410 to send an accessory protocol-tunneling command, specifying that the application protocol is "com.temprus.thermometer1." Protocol manager 410 can package the Get_Temp command inside a TunnelToAcc command packet of the accessory communication protocol and can also look up the application protocol name and determine that this application protocol is associated with port 414. Protocol manager 410 can then route the TunnelToAcc command packet to port 414 for deliver to accessory 402.

Accessory 402 can receive the TunnelToAcc command at port 422. Protocol interpreter 424 can extract the Get Temp command packet and deliver it to process 426, which in this example can be a process that controls a temperature sensor and receives data therefrom. Accordingly, process 426 can obtain temperature data that is to be returned to application 404. To send the data, process 426 can, for example, generate a Send_Temp command packet conforming to the application protocol. This packet can include the requested temperature data (e.g., using the temperature scale specified in the Get_Temp command). Process 426 can provide the Send_Temp command packet as a bundle to protocol interpreter 424, with an indication that it should be sent to mobile computing device 400. Protocol interpreter 424 can package the Send_Temp command packet within a TunnelToHost command of the accessory communication protocol, and port 422 can communicate the TunnelToHost command to port 414 of mobile computing device 400. Port 414 can deliver the incoming TunnelToHost command to protocol manager 410, which can extract the bundle (in this case the Send_Temp command packet) and provide it to support layer 408, along with the information that the bundle is associated with the "com.temprus.thermometer1" protocol, as determined from port map 412. Support layer 408 can then direct the bundle to session 406, in particular to the input stream of session 406. Application 404 can read the bundle from the input stream, recognize it as a Send_Temp command packet conforming to the application protocol, and extract the temperature data.

Figure 6:
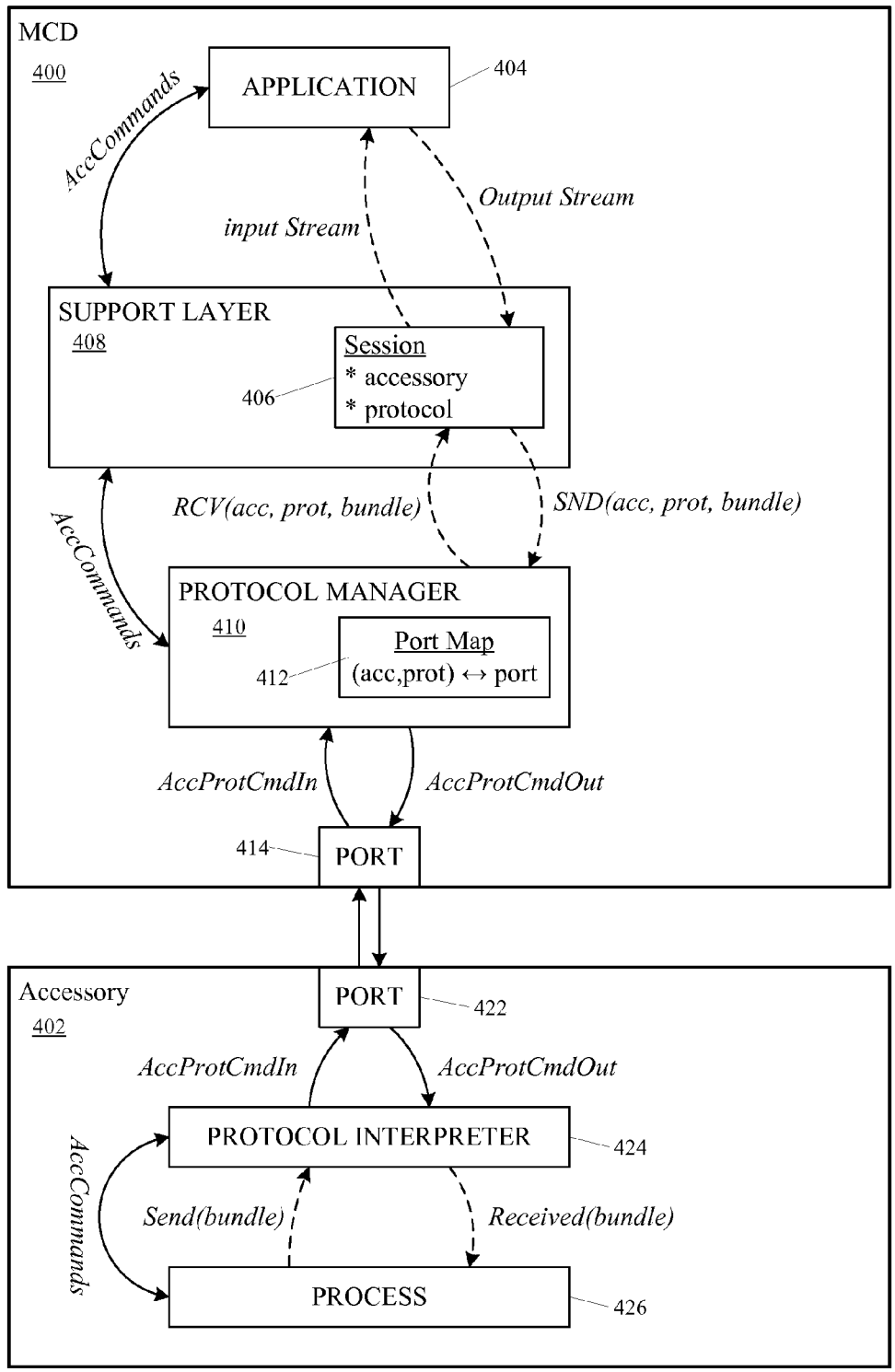
FIG. 6 illustrates a path for commands of the accessory communication protocol in the embodiment of FIG. 4 according to some embodiments of the invention.

In some embodiments, an accessory can use both an application protocol and commands of the accessory communication protocol to communicate with an accessory. FIG. 6 illustrates a path for commands of the accessory communication protocol in the embodiment of FIG. 4. In addition to sending application protocol messages via session 406, application 404 can invoke accessory-protocol commands by making appropriate API calls to support layer 406, which can instruct protocol manager 410 to send an accessory protocol command (represented here as "mobile computing deviceProtCmdOut") via port 414 to accessory 402. Similarly, an accessory-protocol command received from accessory 402 (represented here as "mobile computing deviceProtCmdIn") can be received and processed by protocol manager 410, and protocol manager can communicate the command to support layer 406. Support layer 406, in turn, can act accordingly upon application 404.

In some embodiments, an application protocol can incorporate lingoes and/or commands specified by the accessory communication protocol. For example, the accessory communication protocol can define a tuner lingo, RFTuner, that allows a user to control a radio frequency tuner accessory through the mobile computing device. For instance, the RFTuner lingo can include commands to turn the receiver on and off, to change the station, etc. In some embodiments, a radio tuner application can execute at the mobile computing device, and the radio tuner application executing at the mobile computing device and the radio tuner accessory can support a radio tuner application protocol that allows the radio tuner accessory to communicate with the radio tuner application. Some or all commands of the RFTuner lingo can be used with the radio tuner application protocol, and the radio tuner application protocol can include other commands as well (e.g., commands to control a preset list of stations that the user likes). Thus, the radio tuner application can use the RFTuner lingo as part of the radio tuner application protocol to communicate with the radio tuner accessory, e.g., for changing the station, and can also use other commands of the radio tuner application protocol for other operations. The mobile computing device can also use the RFTuner lingo as part of the accessory communication protocol to communicate with the radio tuner accessory independent of the application. Thus, the radio tuner accessory can send commands and/or messages to the mobile computing device using a single lingo within either of the two protocols.

As another example, the RFTuner lingo can include an RFSetFreq command that is sent from the mobile computing device (for instance, the application executing at the mobile computing device) to tune the radio tuner accessory to the frequency to a frequency included in the command. The radio tuner application can create a packet with the proper header and/or tail as defined by the application protocol, and include the RFSetFreq command and the required frequency in the packet payload. The packet can then be sent to the Protocol manager which can bundle the packet into an accessory protocol packet with a command of the accessory communication protocol, e.g., a TunnelToAcc command as described above. The accessory protocol packet can then be sent to the accessory. As another example, the RFSetFreq command can be used without a radio tuner accessory and without being tunneled. The mobile computing device can send a packet using the accessory communication protocol using the RFSetFreq command and the associated frequency to the accessory as a stand alone packet.

As yet another example, an accessory can use the RFTuner lingo to communicate with the mobile computing device using either the application protocol and/or the accessory communication protocol. For example, the accessory can use the TunnelToHost command to tunnel RFTuner commands to the mobile computing device when communicating with a specific application at the mobile computing device. As another example, the accessory can send RFTuner commands without tunneling to the mobile computing device.

In another embodiment, an accessory such as a speaker dock may provide remote control of media playback on the mobile computing device. The remote control functions can be implemented using commands of the accessory communication protocol; for example, the accessory communication protocol can include a ButtonStatus command that the accessory can send to identify a particular function invoked by the user (e.g., Play, Pause, Next Track, Previous Track, etc.). The mobile computing device can have a playback engine for stored media that can process the ButtonStatus command and respond accordingly. An application executing on the mobile computing device can provide playback of other media sources, e.g., from an Internet data stream. It would be desirable for the user to be able to remotely control the playback of the streaming content by operating the accessory in the same way that the user controls the playback of stored media. Accordingly, a "streaming control" application protocol can be defined that includes commands or other control signals to control the playback of streamed content. The user can operate the accessory in exactly the same way to control playback of either stored or streamed media content. If stored content is being played, the accessory can communicate the remote control information to the playback engine using the accessory communication protocol (e.g., the ButtonStatus command). If streamed content is being played, the accessory can communicate the remote control information to the application using the streaming control application protocol. In one embodiment, the ButtonStatus command of the accessory communication protocol can be incorporated into the streaming control application protocol.

In still another embodiment, an accessory might send location information to the mobile computing device. Location information can include any information representing the location of the accessory and/or the mobile computing device and can be determined in various ways, such as using a Global Positioning System (GPS) receiver and/or triangulating a location based on information about nearby mobile phone network access points. The accessory communication protocol may provide a "location" lingo that is usable by an accessory to transmit location information to the mobile computing device. An application, however, might use location information that is not provided for in the location lingo. Such information can be transmitted by the accessory to the application using an accessory-specific protocol. Thus, depending on how the location information is to be used, the same accessory can transmit location information to the mobile computing device using either the location lingo of the accessory communication protocol or the accessory-specific protocol.

It will be appreciated that the communication paths described herein are illustrative and that variations and modifications are possible. For example, a path may include more or fewer layers at the accessory and/or mobile computing device side. In some embodiments, each mobile computing device tunneling packet will contain one accessory protocol message, but this is not required. For example, a single accessory protocol message might be sent using multiple mobile computing device tunneling packets, provided that the recipient (the accessory or application as the case may be) is capable of reconstructing a message from multiple received data bundles. Similarly, a single mobile computing device tunneling packet might be allowed to contain multiple accessory protocol messages, provided that the recipient is capable of parsing the bundle into multiple messages.

In describing FIG. 4, it was assumed that application 404 had already established session 406 with compatible accessory 402. Examples of techniques enabling an application to identify a compatible accessory (or vice versa) and establish a session will now be described.

Figure 7:
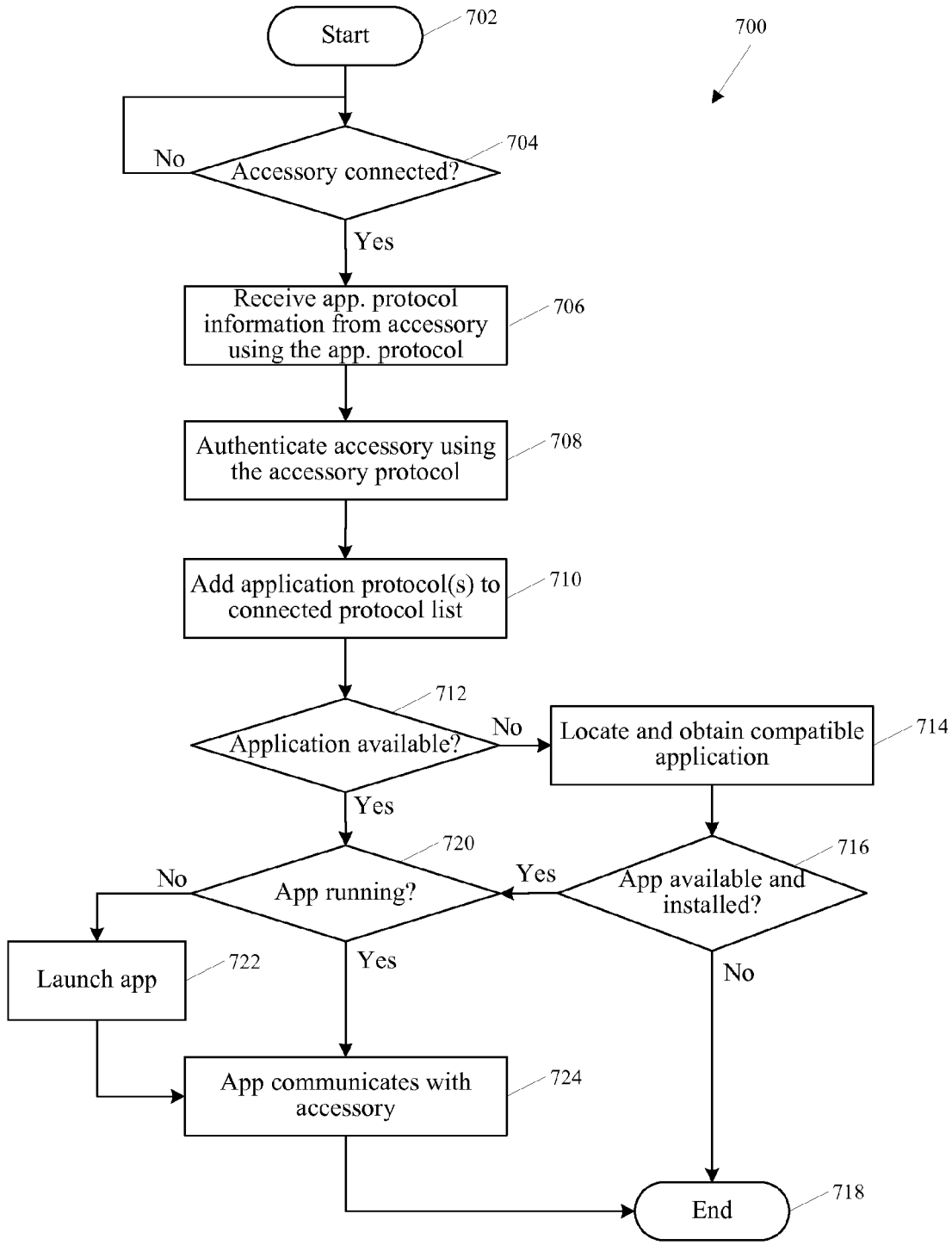
FIG. 7 is a flow diagram of a process for identifying an accessory and compatible application according to some embodiments of the invention.

FIG. 7 is a flow diagram of process 700 for identifying an accessory and compatible application according to an embodiment of the present invention. Process 700 can start at block 702. The mobile computing device can determine whether an accessory has been connected at block 704. For example, the mobile computing device can detect whether an accessory has been physically coupled with a connector, e.g., as shown in FIG. 1A or whether an accessory has been wirelessly coupled with the mobile computing device, e.g., as shown in FIG. 1B. As noted above, an accessory can be considered as being connected whenever a wired or wireless communication channel between the mobile computing device and the accessory is open, and block 704 can include detecting the opening of such a channel. An application manager executing at the mobile computing device can monitor hardware connections or communication modules to determine if a communication channel between the mobile computing device and the accessory is open.

At block 706, the mobile computing device can receive application protocol information from the accessory. In some embodiments, this information can be communicated using packets defined by the accessory communication protocol. In other embodiments, the application protocol information can be communicated in any manner understood by either or both the accessory and the mobile computing device. For instance, the application protocol information can be communicated using any industry standard communication protocol such a USB protocol, Bluetooth protocol, or WiFi protocol. For example, the accessory communication protocol can specify one or more commands and associated data formats that an accessory can send to a mobile computing device to provide information about itself and its capabilities; in some embodiments, these commands can be part of the general lingo of the accessory communication protocol. The information provided by the accessory can include text strings for the name(s) of the application communication protocol(s) supported by the accessory. The names can be specified, for instance, using the reverse domain name convention as described above or any other desired naming convention. The accessory can also send other identifying information. For example, the accessory can send information identifying its type; manufacturer; model name; serial number; hardware, software and/or firmware versions; etc. The accessory can also send information indicating capabilities of the mobile computing device that it is capable of or intending to use. For example, the accessory can specify which lingo of the accessory communication protocol it may use, whether it receives or provides audio and/or video signals from or to the mobile computing device, preferred initial operating states of the mobile computing device (e.g., whether audio and/or video signal exchange should initially be enabled or disabled, a preferred format for audio and/or video signaling), and so on.

In other embodiments, the application protocol can be specified by referencing an application store or from a server over the Internet. For example, when an accessory is coupled with the mobile computing device, the mobile computing device can request application protocol information from the application store and/or from a server through the Internet. In one embodiment, the mobile computing device can send accessory-identifying information such as accessory manufacturer, model name, and/or serial number to the application store or other server and receive application protocol information in response. Application protocol information sent from the accessory, for example, can include the application protocol name; a file specifying various application protocol commands, messages and/or packet specifications; a listing of accessories with which the application protocol is compatible; a listing of applications with which the application protocol is compatible; an indication of a network location where an application or application update can be downloaded; etc. The application protocol information can be sent in a metadata format. In some embodiments, various versions of the application protocol can be made available through the application store or through the Internet. For example, different versions of an application protocol can allow various levels of functionality and can be provided for use with a mobile computing device at different prices. For example, "lite" versions, free versions, full versions, demo versions, etc. can be made available. For example, a full version can define a set of commands usable by the mobile computing device and/or accessory, whereas a lite version defines a subset of the commands defined by the full version.

In some embodiments, application protocols can be enumerated when communicated to the mobile computing device. The accessory can identify each supported application protocol with an index number or some type of indication that relates to each application. For example, the accessory can send a message that indicates that index 1 is application protocol 1, index 2 is application protocol 2, and index 3 is application protocol 3. Each application protocol can be indicated using any type indication such as, for example, using the reverse domain name convention. Later these protocols can be referenced using their index number. Such enumeration can be used in embodiments described throughout this disclosure.

The mobile computing device can authenticate the accessory using authentication procedures in accordance with the accessory communication protocol at block 708. These procedures can include, for example, authentication techniques based on public-key certificates stored in the mobile computing device and private keys held by various accessories and/or other techniques. In some embodiments, the mobile computing device can authenticate every accessory upon connection and identification (e.g., after block 706). In other embodiments, the mobile computing device can authenticate every accessory prior to or during identification at block 706, and in still other embodiments, authentication can occur later in the process or not at all. For example, in some embodiments, the mobile computing device permits certain features and/or operations associated with the accessory communication protocol to be accessed only by authenticated accessories; such "restricted-access" features can include features related to communication of accessory protocol commands (e.g., the tunneling commands described above can be restricted-access commands). The mobile computing device can wait to authenticate an accessory until the accessory attempts to use a restricted-access feature, or the mobile computing device can authenticate the accessory at any time after receiving information indicating that the accessory will or might attempt to use a restricted-access feature.

Figure 8:
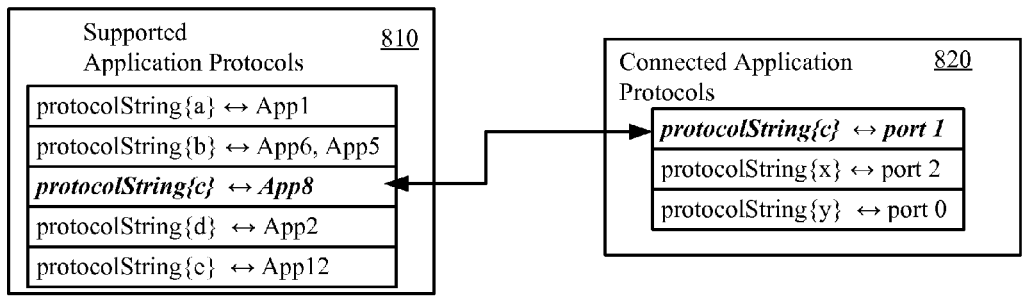
FIG. 8 shows a connected protocol list and a supported-protocol table usable to associate compatible applications and accessories according to some embodiments of the invention.

The mobile computing device can then create and/or update a "connected" application protocol list at block 710 using the application protocol information supplied at block 706. For example, referring to FIG. 3, port map 325 and/or accessory information table 330 can be updated to associate the newly connected accessory and its application protocol(s) with a port. Any of the accessory identifying information provided at block 706 can be stored in a connected application protocol list by the mobile computing device. One example of a connected protocol list is shown in FIG. 8 as table 820. Table 820 lists each application protocol that a currently-connected accessory has identified in association with the port to which the accessory is connected. (Accordingly, table 820 can be an example of port map 325 of FIG. 3). It is understood that the format and information content of table 820 can be varied as desired.

Referring again to FIG. 7, at block 712, the mobile computing device can determine whether any applications are available that use the application protocol(s) associated with the accessory (such applications are also referred to herein as "compatible" applications). For example, the mobile computing device can store a table of supported application protocols, with each protocol being associated with the application (or applications) that supports it. One example of a supported-application protocol table is shown in FIG. 8 as table 810. Table 810 includes a list of application protocol names, and each application protocol name is associated with an identifier of one or more applications. In some embodiments, table 810 can be implemented as a lookup table that can be accessed using the name of an application protocol to return an application identifier; table 810 can also be accessible using an application identifier to return a list of application protocols associated with a particular application.

In some embodiments, table 810 includes only application protocols associated with currently executing applications. For example, when an application launches, it can provide a system process of the mobile computing device (e.g., support layer 315 of FIG. 3) with a list of any application protocols that it requires and/or can use. The mobile computing device system process can update table 810 accordingly. In other embodiments, table 810 can be a persistent table that is maintained for all applications installed on the mobile computing device. For example, installing (or updating) an application can include notifying a system process of the mobile computing device (e.g., support layer 315) of any application protocols that the application requires and/or is capable of using; the mobile computing device can update table 810 accordingly.

In some embodiments, when an accessory is coupled with the mobile computing device, the accessory can identify itself by sending identification information, for example, using an accessory identification lingo associated with the accessory communication protocol. The identification information can be used by the mobile computing device to select an appropriate application communication protocol, for example, by referencing table 810. In some embodiments, the mobile computing device can send accessory identifying information to an application store and/or a server through the Internet to identify an application communication protocol compatible with the accessory. In some embodiments, the application store and/or server can send a file detailing an application communication protocol compatible with the accessory. In some embodiments, the accessory may not send application protocol information to the mobile computing device, rather the accessory can send accessory identification information that is then used by the mobile computing device to chose the proper application communication protocol.

Referring again to block 712 of FIG. 7, in embodiments where a supported application protocol table (e.g., table 810 of FIG. 8) is provided, the mobile computing device can determine whether a compatible application is available by accessing the supported protocol table using the protocol name of the newly connected accessory. For example, as shown in FIG. 8, if the newly connected accessory has provided protocolString{c} as its application protocol identifier, block 712 of process 700 can include looking up protocolString{c} in supported protocol table 810 and thereby determining that an application "App8" is associated with this application protocol. In this case, block 712 would result in a determination that an application is available. As further shown in FIG. 8, if the newly connected accessory has provided protocolString{x} as its application protocol, no match can be found in table 810, and block 712 of process 700 would result in a determination that a compatible application is not available.

If a compatible application is not available, process 700 can facilitate locating and obtaining a compatible application at block 714. For example, the mobile computing device can direct the user to an application store (e.g., the iTunes® Store provided by Apple Inc.) or other resource for purchasing and/or downloading applications. Various types of assistance can be provided. For instance, in some embodiments, the accessory information provided to the mobile computing device at block 706 can include an identifier of a preferred application for use with the accessory. This identifier might be a URL (uniform resource locator, e.g., a World Wide Web page address), a unique product identifier for the preferred application in a particular application store, or the like. The mobile computing device can use this information to locate the preferred application and prompt the user to purchase and/or download the application.

Figure 9:
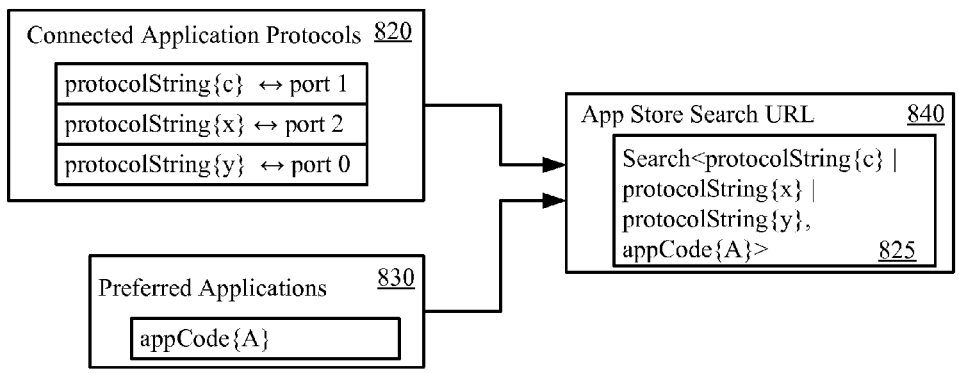
FIG. 9 illustrates a technique for formulating a query usable to locate a compatible application for an accessory according to some embodiments of the invention.

In other embodiments, the mobile computing device can use the application protocol information, with or without other accessory identifying information, to search for a compatible application, e.g., within an application store. For example, as shown in FIG. 9, the mobile computing device can formulate a query 825 using one or more of the connected application protocols and/or an identifier for a preferred application provided by the accessory (represented as appCode 830). The mobile computing device can send query 825 to a URL 840 associated with searching at an application store or another destination. In the example shown, the query includes a list of all connected application protocols (linked with a logical "OR" operand), along with appCode 830 for the preferred application. In the event that multiple applications match the query, preferred application 830 can be used by the application store to highlight the preferred application (assuming it is on the list of matches). Thus, even though a number of applications may be listed that support one or more of the application protocols in connected protocol list 820, preferred application 830 may be the default application and may be listed as such, e.g., at the top of a results list and/or marked with an symbol, word, or logo identifying it as preferred. In some embodiments more than one version of the preferred application may be provided with a ranking, so that the user may be presented with a tiered list. For example, a pro version, a standard version and/or a free version of the preferred application can all be provided.

In response to a query, the application store can return a list of one or more compatible applications, and the mobile computing device can prompt the user to select a compatible application to download. In some embodiments, applications can be installed immediately upon downloading; in other embodiments, the user may be separately prompted to download and then install the application. In yet other embodiments the user may be required to purchase the application. In some embodiments purchase can be made through an application store, using credit, and/or through a previously established account.

In still other embodiments, a compatible application may be pre-stored on the accessory itself, and the accessory communication protocol can include commands allowing the accessory to indicate that it has a compatible application stored thereon; in response to such an indication, the mobile computing device can upload the compatible application from the accessory and install it. (In some embodiments, the mobile computing device may prompt the user for approval prior to uploading and/or installing accessory-provided applications.)

Referring again to FIG. 7, at block 716 it is determined whether a compatible application is now available and installed. (For instance, a compatible application might not have been located or the user might have chosen not to purchase or download it.) If not, process 700 can end at block 718.

If, at block 716, a compatible application is available (either previously installed or just installed via block 714), then at block 720, the mobile computing device can determine whether the compatible application is already running If not, the application can be launched at block 722. Depending on implementation, block 722 can include prompting the user to confirm that the application should be launched.

At block 724, the application can communicate with the accessory. In some embodiments, block 724 can include creating a session and sending and/or receiving application protocol commands via the session, e.g., as described above. Block 724 can also include sending and/or receiving commands and other information using the accessory communication protocol. Thus, the same application and accessory can use functions supported by the accessory communication protocol and can also exchange other information, control signals, data, etc. using an application protocol that might or might not overlap with the functions supported by the accessory communication protocol. Communication can persist indefinitely, e.g., until the accessory becomes disconnected from the mobile computing device and/or the application exits. At that point, process 700 can end (block 718).

Process 700 can be implemented using hardware, software and/or firmware at a mobile computing device. For example, system processes and/or applications may execute to control the functionality of the mobile computing device to perform the actions described above.

In some embodiments, the mobile computing device can maintain a persistent list of all or a number of application protocols supported by any accessory that has ever connected to that mobile computing device even after the accessory disconnects. When the mobile computing device communicates with an application store, the mobile computing device can provide some or all of the protocols on the persistent list to the application store (e.g., as a search query to a server hosting the application store), and the application store can suggest applications that the user might be interested in based on the list. For example, the application store can identify other applications that use the same application protocol(s). If the persistent list also includes information identifying particular accessories associated with each application protocol, the information provided by the application store can identify particular accessories as compatible with the identified applications. This can assist the user in selecting applications to purchase and/or download.

Figure 10:
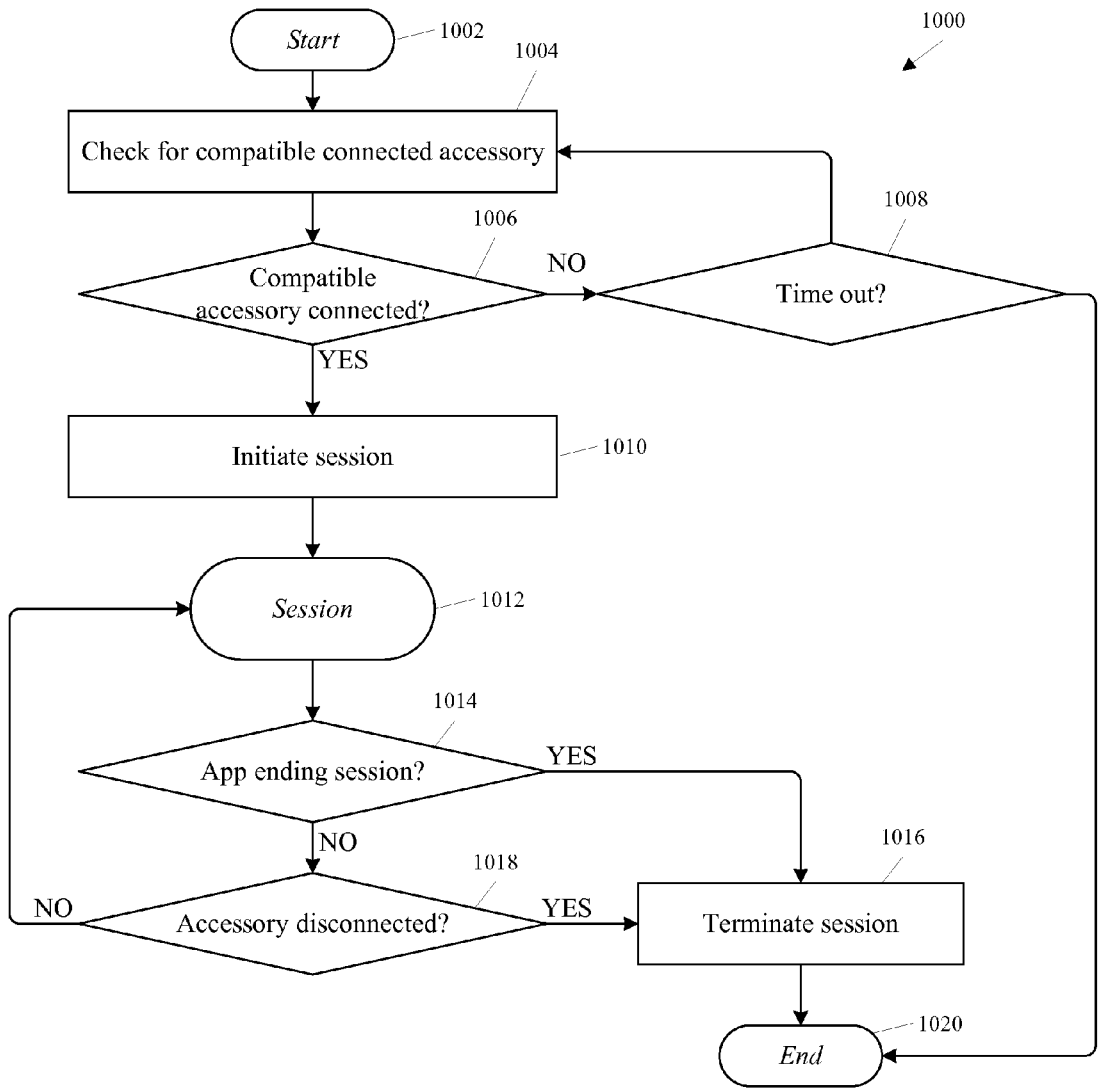
FIG. 10 is a flow diagram of a process that can be executed by an application to initiate communication with an accessory according to some embodiments of the invention.

FIG. 10 is a flow diagram of a process 1000 that can be executed by an application to initiate communication with an accessory according to an embodiment of the present invention. Process 1000 can start (block 1002), e.g., when the application is launched on the mobile computing device. For example, the user can manually launch the application, or the application can be launched automatically by the mobile computing device in response to an accessory connecting (e.g., as described above with reference to FIG. 7).

At block 1004, the application checks to determine whether a compatible accessory is connected. (As used herein, an accessory is "compatible" with a particular application if the accessory supports an application protocol that is required and/or usable by that application.) For example, in embodiments where the mobile computing device maintains a connected accessory table such as table 820 of FIG. 8, the application can query the table using the name of a desired application protocol to determine whether a compatible accessory is connected. This query can include, e.g., invoking an API function call to communicate with a support layer (e.g., support layer 315 of FIG. 3).

If, at block 1006, a compatible accessory is not connected, the application can wait at block 1008 for a certain amount of time and then try again. If, for example, a timeout period is reached, then process 1000 ends at block 1020. In some embodiments, while waiting at block 1008, the application can generate a message to the user prompting the user to connect a compatible accessory. In some embodiments, the application can register with a mobile computing device system service and request a notification when a compatible accessory becomes available rather than repeatedly checking. In still other embodiments, the application can exit if a compatible accessory is not connected and can also notify the user that the application will not run unless a compatible accessory is connected or the application can run with reduced functionality.

If a compatible accessory is detected at block 1010, the application can initiate a session with that accessory. For example, the accessory can invoke an API call of support layer 408 (see FIG. 4) or an application manager (see FIG. 14) to create a session that is associated with a particular accessory and application protocol (e.g., session 406 of FIG. 4). The session, represented in FIG. 10 by block 1012, can continue indefinitely. As described above, during the session the application can send and/or receive messages (e.g., control signals, data, status and/or other information) using the application protocol associated with the session, and the application can also send and/or receive messages using the accessory communication protocol to the extent that desired functionality is supported within the accessory communication protocol.

A session can eventually end. For example, at block 1014, the application can determine that the session should be ended (e.g., in response to a user instruction such as exiting the application or indicating that the accessory is no longer to be used) and can terminate the session at block 1016 in response to such a determination. As another example, at block 1018, the application can be notified that the accessory has disconnected; this can also result in session termination at block 1016. Session termination at block 1016 can include, e.g., invoking an API call to destroy or close the session object and free associated resources. For example, in embodiments where only one session at a time is permitted for a given combination of accessory and application protocol, session termination can signal the mobile computing device that the accessory and its protocol are now free to be used in another session, e.g., with a different application. In some embodiments, terminating the session can result in disconnecting the accessory (e.g., the mobile computing device can close the port); in other embodiments, the accessory can remain connected after the session terminates; and in still other embodiments, the application can instruct the mobile computing device system services as to whether to disconnect the accessory when the session terminates.

Once the session terminates, process 1000 can end. In some embodiments, if the application is still executing after session termination process, 1000 can return to block 1004 to look for a compatible accessory and start a new session.

It will be appreciated that the accessory communication protocol described herein is illustrative and that variations and modifications are possible. Acts described as sequential may be executed in parallel, order of acts may be modified, and/or acts may be added, omitted or combined.

In some embodiments, a mobile computing device can support concurrent connections to multiple accessories and/or concurrent execution of multiple applications. Thus, a single application can be concurrently interacting with multiple accessories, or a single accessory can be concurrently interacting with multiple applications.

Figure 11:
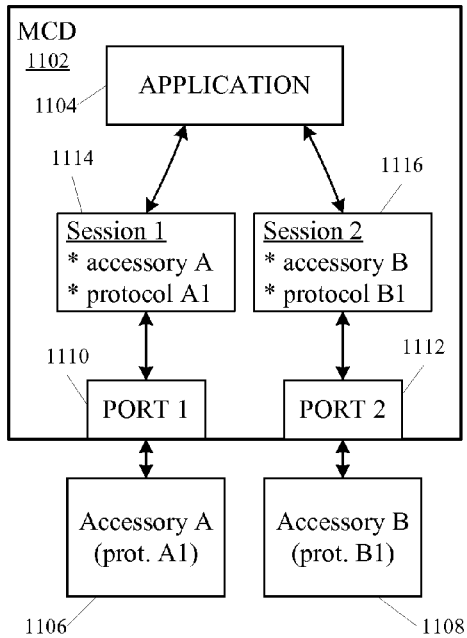
FIG. 11 illustrates an application on a mobile computing device concurrently interacting with two different accessories according to some embodiments of the invention.

For example, FIG. 11 illustrates an application 1100 on mobile computing device 1102 concurrently interacting with accessory A 1106 and accessory B 1108 according to some embodiments of the invention. Accessories A 1106 and accessory B 1108 can be different types of accessories, or they can be similar or even identical accessories. In this example, each accessory is connected on a different port; thus, accessory A 1106 is connected to port 1110 and accessory B 1106 is connected to port 1112. Application 1100 has created two sessions 1114, 1116. Session 1112 is associated with accessory 1104 and uses an application protocol A1, while session 1114 is associated with accessory A 1106 and uses an application protocol B1. Sessions 1112 and 1114 are independent of each other; either can be initiated, used, and/or terminated without affecting the other. In some embodiments, the session can be protocol specific. Port 1110 can use the accessory communication protocol to provide a "tunnel" for messages conforming to protocol A1 to pass between mobile computing device 1102 and accessory 1106, and port 1112 can use the (same) accessory communication protocol to provide a separate tunnel for messages conforming to protocol B1 to pass between mobile computing device 1102 and accessory 1108. It is understood that application protocols A1 and B1 can be different protocols or the same protocol as desired. Further, while two accessories and two sessions are shown, any number of accessories and sessions can be connected with a particular application in the manner described herein, provided only that sufficient hardware and/or software resources (e.g., ports and/or sessions) are available on the mobile computing device.

Figure 12:
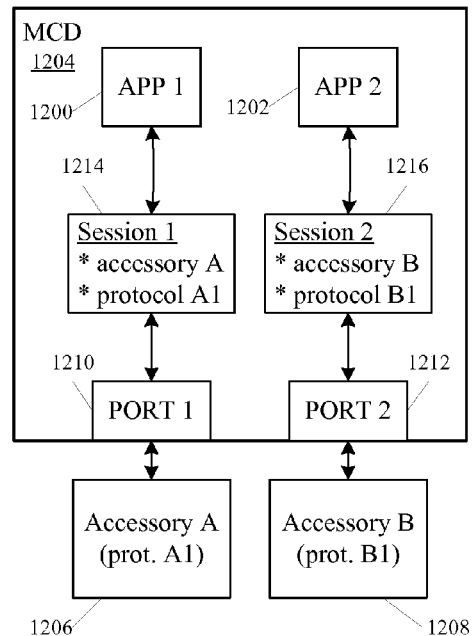
FIG. 12 illustrates two applications on a mobile computing device concurrently interacting with two different accessories according to some embodiments of the invention.

FIG. 12 illustrates two applications, application 1 1200 and application 2 1202, that are executing on mobile computing device 1204 and concurrently interacting with accessory A 1206 and accessory B 1208 according to some embodiments of the invention. Accessories A 1206 and accessory B 1208 can be different types of accessories, or they can be similar or even identical accessories. In this example, each accessory is connected on a different port; thus, accessory A 1206 is connected to port 1210 and accessory B 1208 is connected to port 1212. Application 1 1200 has created a session 1214 associated with accessory A 1206 and application protocol A1, and application 2 1202 has created a session 1216 associated with accessory B 1208 and application protocol B1. Sessions 1212 and 1214 are independent of each other; either can be initiated, used, and/or terminated without affecting the other. Port 1210 can use the accessory communication protocol to provide a tunnel for messages conforming to application protocol A1 to pass between mobile computing device 1204 and accessory 1106, and port 1212 can use the (same) accessory communication protocol to provide a separate tunnel for messages conforming to application protocol B1 to pass between mobile computing device 1204 and accessory 1208. As with FIG. 11, it is understood that application protocols A1 and B1 can be different protocols or the same protocol as desired. Further, while two accessories, two applications, and two sessions are shown, any number of accessories, sessions, and/or applications can be concurrently supported in the manner described herein, provided only that sufficient hardware and/or software resources (e.g., ports and/or sessions) are available on the mobile computing device.

Figure 13:
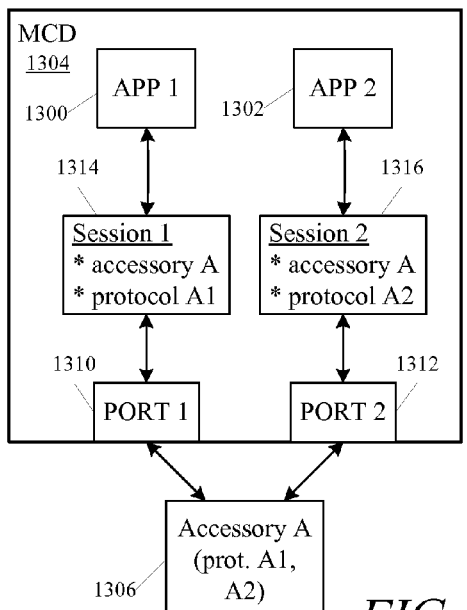
FIG. 13 illustrates two applications on a mobile computing device concurrently interacting with the same accessory according to some embodiments of the invention.

FIG. 13 illustrates two applications, application 1 1300 and application 2 1302, executing on mobile computing device 1304 and concurrently interacting with an accessory 1306 according to some embodiments of the invention. In this example, accessory 1306 supports two different application protocols (A1 and A2). Protocols A1 and A2 can differ in name only, or they can be two distinct and potentially incompatible protocols. Accessory 1306 is connected to mobile computing device 1304 on port 1310, which is associated with protocol A1, and is also connected to mobile computing device 1304 on port 1312, which is associated with protocol A2. Application 1 1300 has created a session 1314 associated with accessory 1306 and application protocol A1 and can therefore communicate with accessory 1306 via port 1310. Similarly, application 2 1302 has created a session 1316 associated with accessory 1306 and application protocol A2 and can therefore communicate with accessory 1306 via port 1312. Sessions 1312 and 1314 are independent of each other; either can be initiated, used, and/or terminated without affecting the other. Port 1310 can use the accessory communication protocol to provide a tunnel for messages conforming to application protocol A1 to pass between mobile computing device 1304 and accessory 1306, and port 1312 can use the (same) accessory communication protocol to provide a separate tunnel for messages conforming to application protocol A2 to pass between mobile computing device 1304 and accessory 1306. While two applications, and two sessions are shown, any number of accessories, sessions, and/or applications can be concurrently connected to the same accessory in the manner described herein, provided only that sufficient hardware and/or software resources (e.g., ports and/or sessions) are available on the mobile computing device.

It will be appreciated that the system configurations of FIGS. 11-13 are illustrative and that variations and modifications are possible. For example, any number of applications and any number of accessories can be connected using any number of sessions and ports. As described above, the session can be a software entity that hides the application from the details of the physical connections (e.g., ports and the like). Thus, the application does not need to know which port a compatible accessory is connected to in order to communicate with it. Further, the communication path can also include other intermediate layers (e.g., a protocol manager and/or protocol daemon layer as described above).

An application manager can be used to abstract a communication connection between an application and a communication port to make the particulars of a communication protocol transparent to application programs. In some embodiments, when a communication connection is abstracted, an application program can communicate with an accessory by writing data to an output stream and reading data from an input stream without knowing any details of the accessory it is communicating with. This can occur using an application manager.

Figure 14:
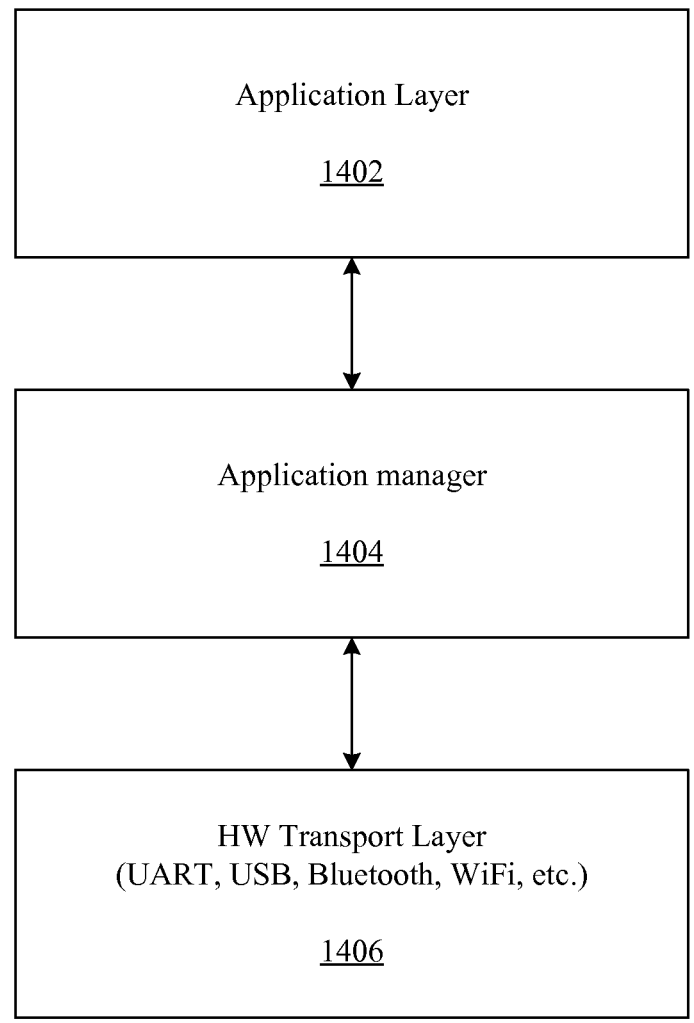
FIG. 14 illustrates the flow of data between an application, the application manager and the hardware transport layer of a mobile computing device according to some embodiments of the invention.

In some embodiments, an application manager can include portions of or be implemented by the support layer 408 or protocol manager 410 shown in FIG. 4. FIG. 14 illustrates an example of such an abstraction. The figure shows the flow of data between application layer 1402, application manager 1404, and hardware transport layer 1406 of a mobile computing device according to some embodiments of the invention. The application layer 1402 can be any kind of process running at the mobile computing device. The hardware transport layer 1402 can include any type of hardware interface or software interface between the mobile computing device and the accessory.

Application manager 1404 can provide communication interface between accessories through the hardware transport layer 1406 and through the application layer 1402. In doing so, communication can be abstracted such that application 1402 does not know the specifics of the accessory with which it is communicating or the specifics of the port where the accessory is coupled. Application manager 1404 can be a background process that is part of the operating system of the mobile computing device or another background process executing at the mobile computing device. Application manager 1404 can provide input and output streams to an application that can be used to communicate with an accessory.

In some embodiments, application manager 1404 can manage connected accessories that are coupled with the mobile computing device and can be accessed through hardware transport layer 1406. Application manager 1404 can also manage accessory communication features of applications executing or installed on the mobile computing device. In both cases, application manager 1404 can store application protocol information associated with accessories and/or applications. FIGS. 15-18 show various processes that can be implemented to establish sessions and provide communication between an application and an accessory using the application manager.

Figure 15:
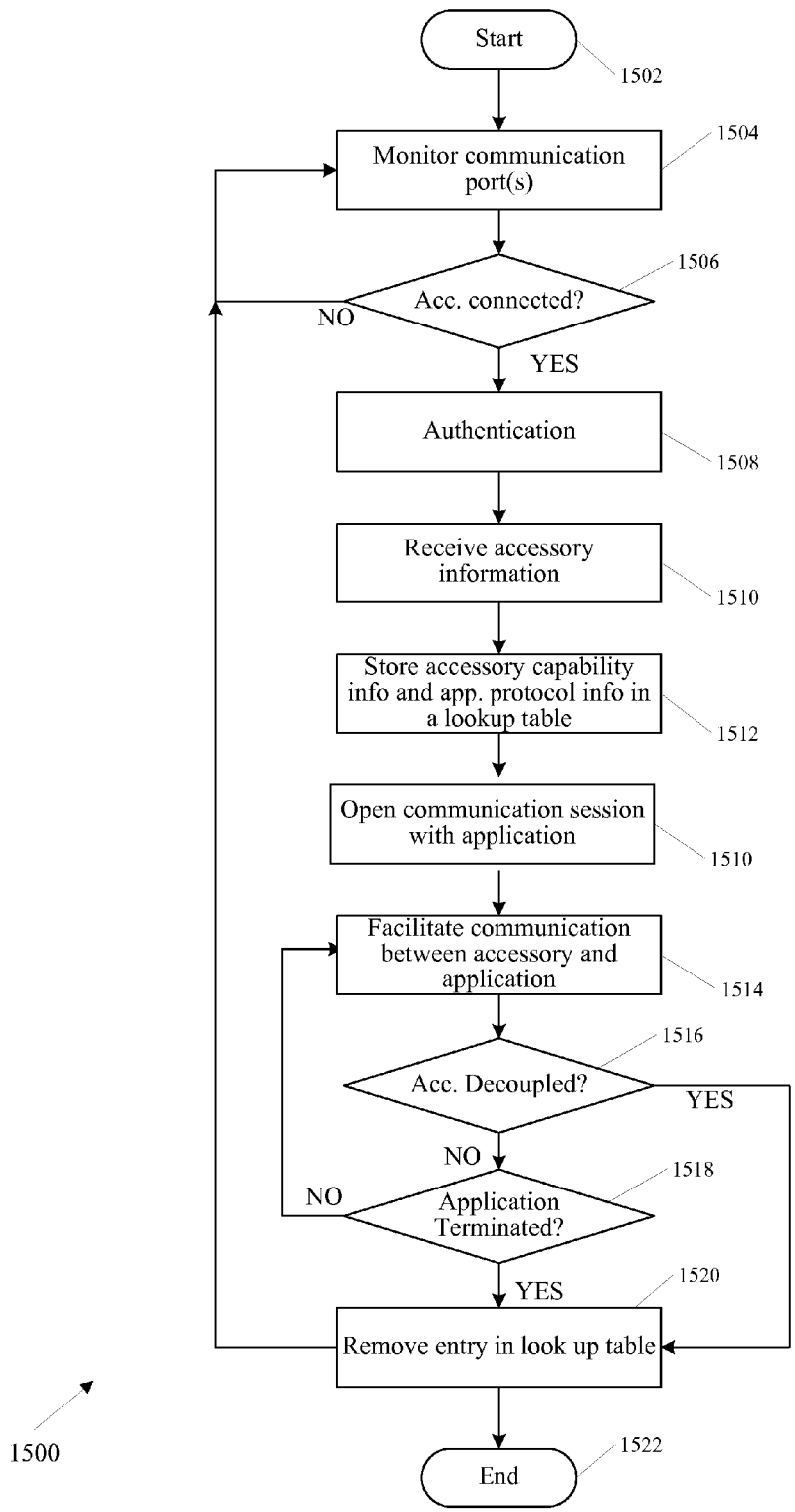
FIG. 15 is a flow diagram of a process that can be executed by an application manager at a mobile computing device according to some embodiments of the invention.

FIG. 15 is a flow diagram of process 1500 that can be executed by an application manager at a mobile computing device to establish and manage a session according to some embodiments of the invention. Process 1500 can start at block 1502. At block 1504, the application manager monitors the communication ports to determine whether an accessory has been connected (i.e., is in communication) with the mobile computing device. In some embodiments, the application manager can monitor the hardware state of a physical connector to determine if an accessory is coupled with the mobile computing device. In some embodiments, the application manager can receive an indication from a WiFi or Bluetooth module indicating that a wireless connection has been established. Regardless of the type of port, the application manager can determine whether a communication channel has been established with the accessory. At block 1506 process 1500 continues to monitor whether an accessory is coupled with the mobile computing device.

Once a communication channel has been established as determined at block 1506, process 1500 can then perform authentication processes at block 1508. Authentication can proceed by sending various messages between the mobile computing device and the accessory using the accessory protocol. Once the accessory is authenticated and given permission to communicate with the mobile computing device, accessory capability information can be received at block

1510. The capability information can include information indicating one or more application protocols with which the accessory is compatible. Application protocols can be indicated using, for example, a reverse domain name convention as described above, or any other convention to indicate the application protocol. Some or all of the information can be stored in memory at the mobile computing device at block 1512. In particular, the application protocols can be stored in a lookup table (e.g., the connected application protocol table 820 of FIG. 8) that associates application protocols with the communication port where the accessory is coupled.

At block 1514 the application manager can determine whether to allow communication between the accessory and the mobile computing device or an application executing at the mobile computing device using an application protocol supported by the accessory. In some embodiments, communication can be allowed if an application (or other process) is executing on the mobile computing device that supports an application protocol supported by the accessory. For example, the application manager can compare application protocols supported by applications executing at the mobile computing device with application protocols stored in the lookup table. Communication between the accessory and application can occur using the application protocol. In some embodiments, an application protocol message can be tunneled or embedded within an accessory protocol message (e.g., by wrapping the application protocol message within an accessory protocol message). As long as the accessory is not decoupled from the mobile computing device at block 1516 and/or execution of the application is not terminated at block 1518, communication can continue. Otherwise, in some embodiments, application protocols stored in the lookup table can be removed at block 1520, and process 1500 can end at block 1522.

Figure 16:
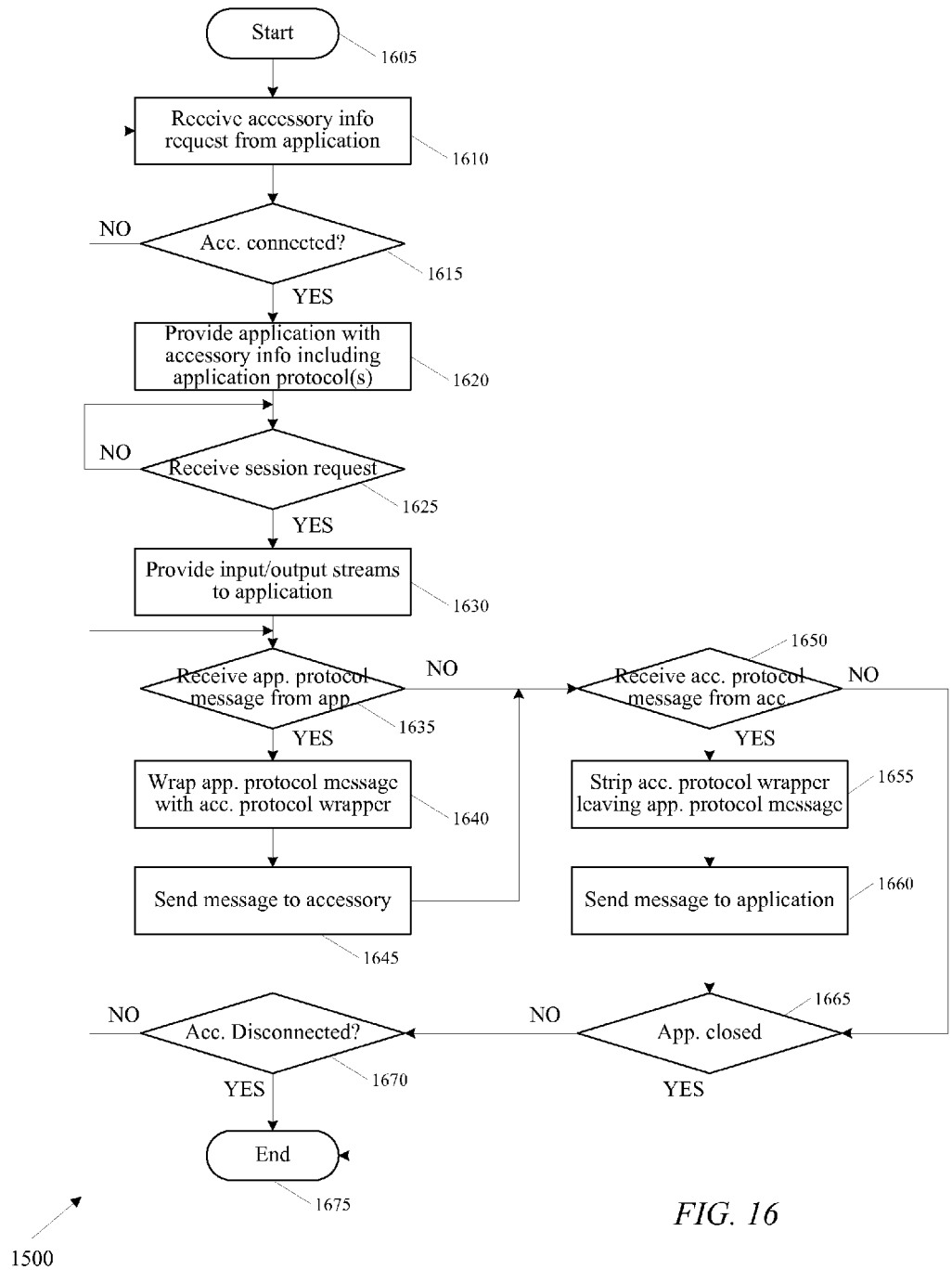
FIG. 16 is another flow diagram of a process that can be executed by an application manager at a mobile computing device according to some embodiments of the invention.

FIG. 16 is another flow diagram of a process that can be executed by an application manager at a mobile computing device to coordinate communication between an accessory and an application executing at the mobile computing device according to some embodiments of the invention. Process 1600 can start at block 1605. At block 1610 application manager can receive a request for accessory information from an application executing at the mobile computing device. If an accessory is not attached at block 1615, a message can be sent to the application so indicating, and process 1600 can return to block 1610 and wait until an accessory is coupled with the MCD or in some embodiments process 1600 can end. If an accessory is connected with the mobile computing device then the application manager can provide the application with accessory information including an indication of any application protocols supported by each and every accessory coupled with the mobile computing device at block 1620. The application manager can send any or all of the application protocol information, including the application protocols supported by the accessory as metadata, e.g. using the reverse domain name convention. Each application protocol can be associated with an application protocol identifier.

In some embodiments, rather than requesting accessory information, the application can send application protocol data to the application manager. And the application manager can select an application protocol from a lookup table (e.g. the connected application protocol table 820) that is compatible with the application protocol data sent from the application, if one exists.

At block 1625, the application can open a communication session for an application protocol and can indicate the protocol to the application manager; for example, using the application protocol identifier. In doing so, the application can make the request without specifying anything about the accessory or the port. In response to opening the communication session the application manager can provide an output stream and an input stream associated with the session to the application at block 1630. In some embodiments, the communication session is opened for a particular protocol associated with a particular accessory. So multiple sessions can be created using multiple protocols for communication with one or many accessories.

At block 1635, the application manager can receive an application protocol message from the application using the application protocol associated with the communication session. The application protocol message can be received at the application manager using the output stream provided at block 1630. The application manager can then wrap the application protocol message with an accessory protocol wrapper at block 1640. In some embodiments, this wrapping can include embedding the application protocol message within an accessory protocol message (e.g., as shown in FIGS. 5A, 5B and 5C). In some embodiments, this wrapping can tunnel the application protocol message using the accessory protocol. At block 1645 the wrapped application protocol message can be sent to the accessory. Process 1600 can then proceed to block 1650. Turning back to block 1635, if the application manager does not receive an application protocol message at block 1635 process 1600 can proceed to block 1650.

At block 1650, the application manager can receive an accessory protocol message from the accessory. The accessory protocol message can include an application protocol message wrapped within an accessory protocol message. At block 1655, the accessory protocol wrapper can be stripped from the application protocol message; and the application protocol message can be sent to the application at block 1660.

If either the accessory is disconnected from the mobile computing device 1670 or the application ceases to execute at the mobile computing device 1665 than process 600 can end at block 1675. Otherwise the process returns to block 1635.

Figure 17:
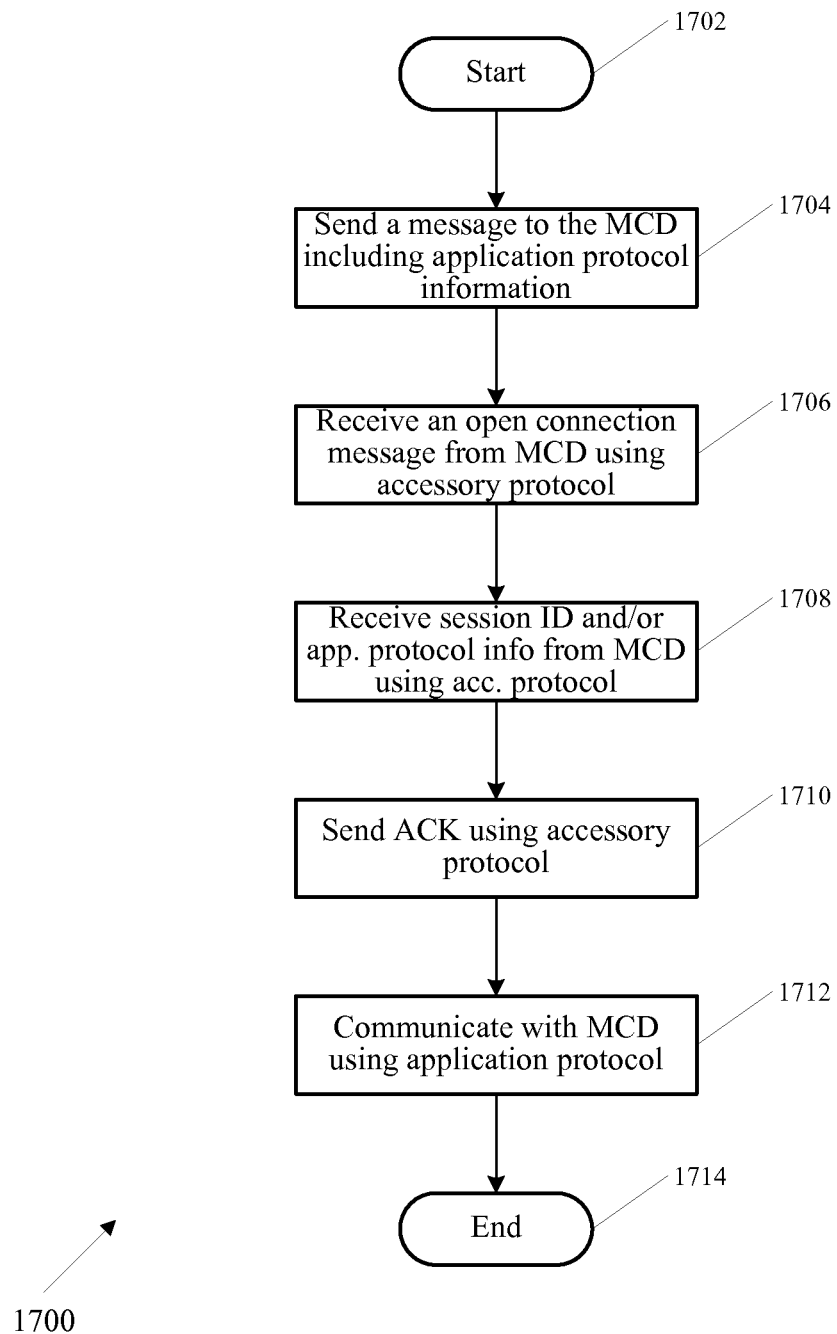
FIG. 17 is a flow diagram of a process that can be executed by an accessory coupled with a mobile computing device to open communication with an accessory according to some embodiments of the invention.

A process that can be performed at an accessory coupled with a mobile computing device is shown in FIG. 17. Process 1700 can start at block 1702, when an accessory becomes connected with the mobile computing device. At block 1704 the accessory can send a message to the mobile computing device indicating the application protocols supported by the accessory. This message may be part of the accessory capabilities described in regard to block 1510 of FIG. 15. This message can be sent in accordance with the accessory protocol. The accessory can indicate the application protocols using a reverse domain name convention (e.g., as described above). When a communication session has been established by the application manager, at block 1706, the mobile computing device can send the accessory a message, using the accessory protocol, indicating that a communication session has been created. This message, or a subsequent message, can indicate the application protocol used to create the session as indicated in block 1708. In some embodiments, at block 1708 a session ID can be communicated instead of or in addition to the application protocol. At block 1710 an acknowledgement message can be sent to the mobile computing device from the accessory using the accessory protocol prior to communicating with the mobile computing device using the application protocol at block 1712. Process 1700 can end at block 1714. Process 1700 can end, for example, when the application is closed by the user or the operating system, when the application or operating system closes the session, and/or when the accessory is disconnected.

Figure 18:
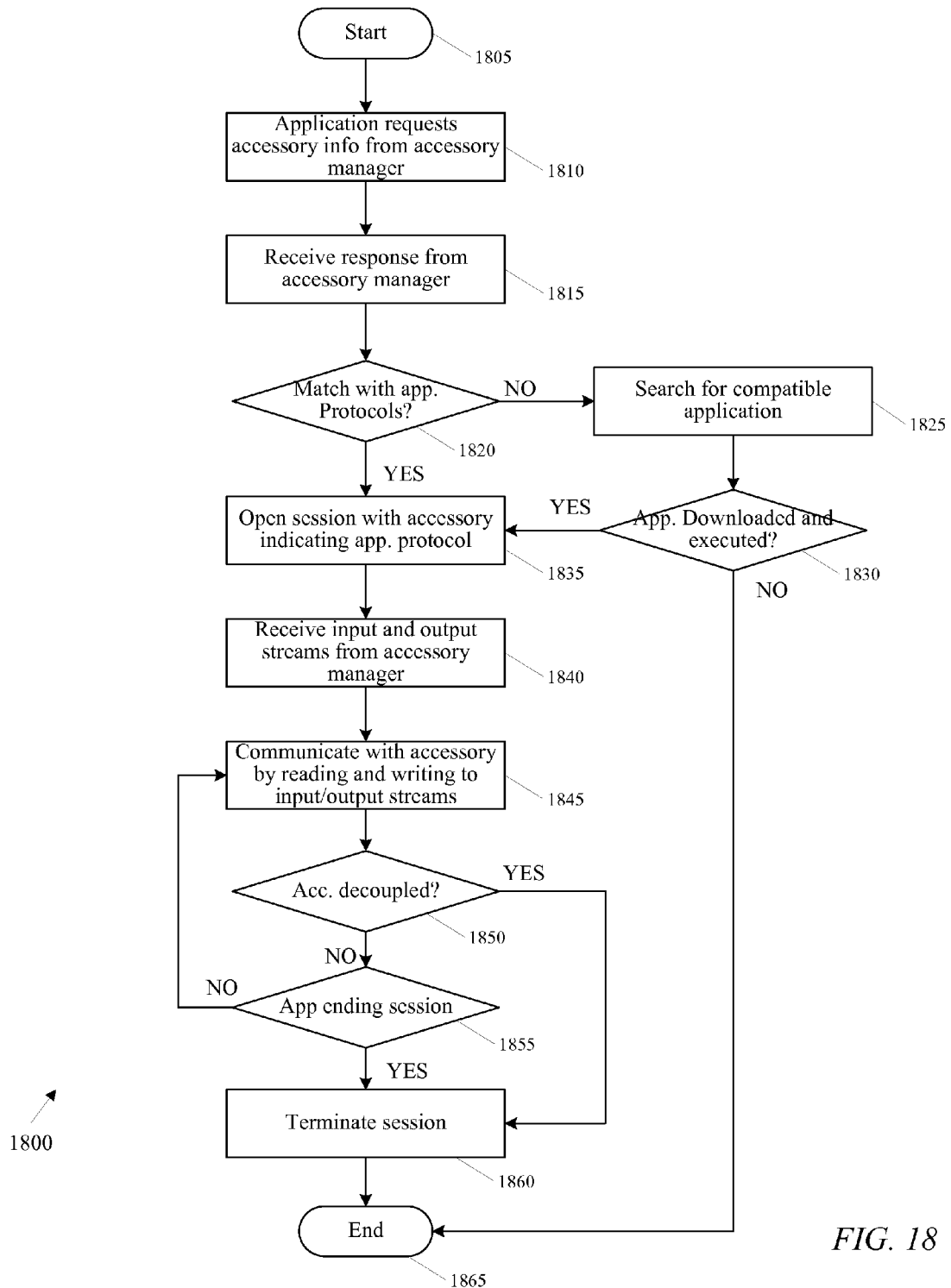
FIG. 18 is a flow diagram of a process that can be executed by an application at a mobile computing device to open a communication with an accessory according to some embodiments of the invention.

FIG. 18 is a flow diagram of process 1800 that can be executed by an application at a mobile computing device to open a communication with an accessory according to some embodiments of the invention. Process 1800 can begin at block 1805. At block 1810 the application can request information about the connected accessories from the application manager. The application manager can respond by sending accessory information to the application, which can be received by the application at block 1815. A response from the application manager can be received at block 1815 that includes accessory information. The accessory information can include information indicating the accessories coupled with the mobile computing device, the application protocol(s) compatible with the accessory, and/or identifiers associated with the application protocol(s). In some embodiments, the accessory manger can direct the application to the memory location where a listing or table of the connected application protocols can be located.

At block 1820 the application (or mobile computing device) can determine whether any of the application protocols or a single application protocol that is compatible with an attached accessory matches an application protocol compatible with the application. If a match is found, process 1800 moves to block 1835. If there are no matches, an application that is compatible with an application protocol associated with the accessory can be searched for on the internet (e.g., at an online application store) or on the mobile computing device at block 1825. In some embodiments, the accessory information can include information indicating a preferred application for use with the accessory. In some embodiments, an application can be downloaded and executed at the mobile computing device at block 1830 and process 1800 can move to block 1835. In some embodiments, an application add-on or patch can be downloaded from a network location (e.g., at an online application store) that provides compatibility with an application protocol that is also compatible with the accessory. If a new application is not downloaded and there are not compatible applications found, then process 1800 can end at block 1865.

In some embodiments, at block 1820, in the event no compatible applications are found or available at the mobile computing device one of three options can be performed. First, the user is prompted whether they'd like to search for and/or download a compatible application from a network location or application store. The process can the proceed in accordance with the user's choice. Second, the mobile computing device can search for and/or download a compatible application without prompting the user. Third, the mobile computing device may neither prompt the user nor search for a compatible application. In some embodiments, the accessory can send a message indicating which of the above three options should be followed by the mobile computing device. This message can be sent prior to or at block 1810 or block 815. In other embodiments, a system setting at the mobile computing device can be set by the user indicating which of the above options should be followed for all accessories.

At block 1835, the application can open a communication session that is tied to a compatible application protocol. Once a session is created, the application manager can provide input and output streams to the application at block 1840. At block 1845, the application can communicate with the accessory by writing data formatted according to the application protocol to the output stream, and by reading application protocol data from the input stream.

As long as the accessory is coupled with the mobile computing device, as determined at block 1850, and the application does not end the session at block 1855, the application can communicate with the accessory using the input/output streams provided by the application manager. Otherwise, the session can be terminated at block 1860 and process 1800 can end at block 1855.

In some embodiments of the invention, when an accessory connects with a mobile computing device, the accessory can send accessory information that includes metadata specifying a preferred application. This information, for example, can be sent during an identification phase, authentication phase, or capabilities phase. In some embodiments, if preferred application is not executing on the application and is stored in memory at the mobile computing device, the application can be automatically launched. In some embodiments, the mobile computing device can provide a notice to the user asking the user whether they'd like to launch the preferred application, and launch the application if the user responds affirmatively.

In some embodiments of the invention, if any of the preferred applications (that is, applications preferred by the accessory) are loaded on the mobile computing device, the mobile computing device can highlight an icon related to one or each of the preferred applications on a home screen of the user interface. Thus a user can more easily locate compatible applications for use with the accessory. For example, when highlighting the application icon, the mobile computing device can change the color or shade of the icon, wiggle or vibrate the icon, enlarge the icon, change the shape of the icon, change the picture on icon, etc. Any aspect of the icon can be changed.

In other embodiments of the invention, if the preferred application is not stored or loaded on the mobile computing device, the mobile computing device can be directed to a network location, such as an application store to download the preferred application. In some embodiments, the metadata can be saved and the preferred application can be downloaded from a network location at a later time. For example, the application can be downloaded when the user directs a web browser or application store to a specified network location where the preferred application can be downloaded. As another example, the application can be downloaded when the user has the proper level of wireless connectivity to download the preferred application. In some embodiments, the preferred application can be loaded when the mobile computing device is coupled with a host computer.

Moreover, in some embodiments, the metadata sent from the accessory to the mobile computing device can also include an indication specifying how to behave when the preferred application does not match an application loaded on the mobile computing device. This indication can be part of a command or message. For example, the accessory can specify that the preferred application must match an application at the mobile computing device and the preferred application must be downloaded to interact with the accessory. As another example, the accessory can specify a preferred application, but will interoperate with any application with a compatible application protocol. In this case, the mobile computing device can download the preferred application but it is not required. Moreover, in some cases the mobile computing device can request feedback from the user about whether to download the preferred application or use a compatible application. As yet another example, the accessory can specify that mobile computing device never search for or download an application from a network location or application store. Moreover, in some situations, the accessory can specify that the user never be asked whether to download the application. In this scenario, the accessory can operate without interaction with an application at the mobile computing device.

In yet another embodiment of the invention, an accessory can be coupled with a mobile computing device and a first application can be executing at the mobile computing device. The first application can be associated with an application protocol that may or may not be compatible with accessory and the application may or may not be in communication with the accessory. The accessory can send a command to the mobile computing device specifying a second application to execute. This can be initiated in response to an interaction with a user; for example, from the press of a button at the accessory from the user. The mobile computing device can then execute the second application in response to receiving the command. In some embodiments the first application can run in parallel with the second application. In some embodiments, the first application can be closed and the second application loaded. In some embodiments the command can indicate the application by serial number and/or name. In some embodiments, the command can also specify a network location where the application can be downloaded and then executed. Moreover, in some embodiments the accessory can request that the second application execute when no application is executing at the mobile computing device or when the operating system is executing at the mobile computing device.

While the invention has been described with respect to specific embodiments, one skilled in the art will recognize that numerous modifications are possible. For example, in certain embodiments described herein, a port is associated with, at most, one application protocol at any given time. In other embodiments, communications using different application protocols can be multiplexed on the same port, and/or communications with different applications using the same application protocol can be multiplexed on the same port. In such embodiments, mobile computing device-protocol commands used for tunneling accessory protocol messages (in either direction) can include a session and/or application protocol identifier to facilitate proper handling of the accessory protocol messages. In one such embodiment, when an application establishes a session associated with a particular accessory and application protocol, an identifier of that session can be provided to the accessory using a command of the accessory communication protocol. Subsequent mobile computing device-protocol packets (e.g., tunneling command packets) associated with that session can include the session identifier. Thus, the accessory can associate any accessory protocol messages it may send or receive with a particular session, even if multiple sessions are concurrently in progress and even if communications related to multiple sessions are multiplexed onto the same port. The accessory can then maintain separate state information for multiple sessions, even if communications for multiple sessions are multiplexed onto a single port.

Embodiments of the invention have been described that provide an example of how an application communication protocol can be used for communication between an application and an accessory. In many cases the mobile computing device can be agnostic regarding the application communication protocol. Some embodiments describe schemes whereby the accessory and/or the application communicate information specifying the application communication protocol. Various other techniques can be used so the accessory and/or the application knows which application protocol to use. For example, the mobile computing device can include a table with all the known application protocols. The accessory and/or application can specify the application protocol by pointing to the table entry. As another example, the application can request application protocol information from the accessory using any number of communication protocols. As another example, the application can specify to the accessory any protocols supported by the application and the accessory can chose the application protocol to use. As yet another example, a bit mask can be used where predetermined different bitmasks can be used to represent various application protocols. Various other means for identifying the application protocol can also be used.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

While examples and/or details are described in this disclosure in relation to a single embodiment such examples or details can be used in conjunction with any embodiment described herein.

Thus, although the invention has been described with respect to specific embodiments, it will be appreciated that the invention is intended to cover all modifications and equivalents within the scope of the following claims.

What is claimed is:

1. A method comprising:
receiving, by a mobile computing device from an accessory external to and communicatively coupled with the mobile computing device, a request for executing an application, the request including an indicator identifying a first set of one or more application protocols supported by the accessory for communicating with the application, wherein the request is received using an accessory protocol that is distinct from each of the one or more application protocols,
wherein the accessory protocol enables communication between the accessory and an operating system component of the mobile computing device and wherein each of the one or more application protocols is specific to one or more particular applications executable on the mobile computing device;
determining, by the mobile computing device, whether an application satisfying the request is available for execution at the mobile computing device, the determining comprising comparing the first set of one or more application protocols with a second set of one or more application protocols supported by applications resident on the mobile computing device;

if an application satisfying the request is not available for execution at the mobile computing device:

sending, by the mobile computing device, information to an application store through a network, the information comprising at least a portion of the indicator;

downloading, by the mobile computing device, an application associated with the indicator from the application store, wherein the downloaded application is an application satisfying the request; and executing the application satisfying the request, wherein executing the application includes communicating, by the application, with the accessory using the application protocol, wherein communicating with the accessory using the application protocol includes:

writing, by the application, a message conforming to the application protocol to an output stream;

generating, by the operating system component of the mobile device, a bundle from the output stream; and transmitting the bundle to the accessory device via a port, wherein the bundle is transmitted in conformity with the accessory protocol.

2. The method of claim 1 wherein executing the application further includes:

transmitting information specifying the matched application protocol to the accessory, wherein the information is transmitted using the accessory protocol; and communicating, by the application, with the accessory using the matched application protocol.

3. The method of claim 2 wherein the information specifying the matched application protocol includes a session identifier.

4. The method of claim 2 further comprising:

while the selected application is executing, communicating, by an operating system component of the mobile computing device, with the accessory using the accessory protocol.

5. The method of claim 1 wherein the downloaded application supports at least one application protocol in the first set of one or more application protocols.

6. The method of claim 1 wherein the application store is an Internet-based application store.

7. The method of claim 1 wherein the indicator is associated with a plurality of applications, and wherein the determining determines whether all of the plurality of applications are available for execution at the mobile computing device.

8. The method of claim 1 wherein the indicator further comprises an application type associated with a plurality of applications.

9. The method of claim 1 further comprising receiving from the application store a listing of applications associated with the indicator that are available for download.

10. The method of claim 9 further comprising:

prompting a user to select an application from the listing of applications;

receiving the selection from the user; and sending an indication of the user's selection to the application store.

11. The method of claim 9 wherein the listing of applications includes a preferred application.

12. The method of claim 1 wherein the information sent to the application store comprises a URL.

13. The method of claim 1 wherein the information sent to the application store comprises a product identifier or an application identifier.

14. The method of claim 1 wherein the information sent to the application store comprises an identifier of an application protocol.

15. The method of claim 1 wherein the application is a program that, when executed, provides a user interface for interacting with the accessory via the mobile computing device.

16. A computer-readable storage medium having stored thereon program code executable by a processor of a mobile computing device, the program code comprising instructions that, when executed by the processor, cause the processor to perform a method comprising:

receiving information from an accessory external to and communicatively coupled with the mobile computing device identifying an application, the information including an application protocol identifier representing an application protocol supported by the accessory for communicating with the application, wherein the information is received using an accessory protocol that is distinct from the application protocol, wherein the accessory protocol enables communication between the accessory and an operating system component of the mobile computing device and wherein the application protocol is specific to a particular application executable on the mobile computing device;

determining whether the application identified by the received information is available at the mobile computing device;

if the application identified by the received information is not available at the mobile computing device:

sending to an application store a request that includes the information identifying the application; and downloading the application identified by the information from the application store; and executing the application identified by the received information, wherein executing the application includes communicating, by the application, with the accessory using the application protocol, wherein communicating with the accessory using the application protocol includes:

writing, by the application, a message conforming to the application protocol to an output stream;

generating, by the operating system component of the mobile device, a bundle from the output stream; and transmitting the bundle to the accessory device via a port, wherein the bundle is transmitted in conformity with the accessory protocol.

17. The computer-readable storage medium of claim 16 wherein determining whether the application is available at the mobile computing device comprises:

determining whether the application protocol identifier is in a lookup table of supported application protocol identifiers, the supported application protocol identifiers representing application protocols supported by applications installed on the mobile computing device.

18. The computer-readable storage medium of claim 17 wherein executing the application further comprises:

initiating a communication session between the application executing on the mobile computing device and the accessory;

transmitting to the accessory information including the matching application protocol identifier, wherein the information is transmitted using the accessory protocol; and communicating, by the application executing on the mobile device, with the accessory using an application protocol corresponding to the matching application protocol identifier.

19. The computer-readable storage medium of claim 18, wherein the method further comprises:
while the application is executing, communicating, by an operating system component of the mobile computing device, with the accessory using the accessory protocol.

20. The computer-readable storage medium of claim 16 wherein the information identifying the application further includes a URL, a unique product identifier, or a product type.

21. The computer-readable storage medium of claim 16 wherein the application is downloaded from the application store without receiving an indication from a user to do so.

22. The computer-readable storage medium of claim 16 wherein the downloading occurs in the event an indication to download is received from a user.

23. A method comprising:
receiving, by a mobile computing device, information identifying an application communication protocol from an accessory device external to and communicably coupled with the mobile computing device, wherein the information is received using an accessory protocol that enables communication between the accessory device and an operating system component of the mobile computing device, wherein the application communication protocol is a protocol supported by the accessory device for communication with a particular application executable on the mobile computing device, and wherein the accessory protocol is distinct from the application communication protocol,
determining, by the mobile computing device, whether the application communication protocol is found within a protocol table resident on the mobile computing device, the protocol table storing data identifying application communication protocols supported by applications resident on the mobile computing device;
if the application communication protocol is found within the protocol table, executing an application that supports the application communication protocol, wherein executing the application includes communicating, by the application, with the accessory using the application communication protocol; and
if the application communication protocol is not found within the protocol table:
sending to an application store, a request that includes the information identifying the application communication protocol;
downloading, by the mobile computing device, an application that supports the application communication protocol from the application store; and
executing the downloaded application, wherein executing the application includes communicating, by the application, with the accessory using the application communication protocol
wherein communicating with the accessory using the application communication protocol includes:
writing, by the application, a message conforming to the application communication protocol to an output stream;
generating, by the operating system component of the mobile device, a bundle from the output stream; and
transmitting the bundle to the accessory device via a port, wherein the bundle is transmitted in conformity with the accessory protocol.

24. The method of claim 23 wherein the information identifying the application communication protocol identifies the application communication protocol using a reverse domain name format.

25. The method of claim 23 wherein the information identifying the application communication protocol includes an identification of a preferred application that supports the application communication protocol, and wherein the method further comprises, if the application communication protocol is not found within the protocol table, downloading the preferred application.

26. The method of claim 23 wherein downloading an application that supports the application communication protocol comprises:
directing a user to a network location associated with the application store;
receiving a listing of one or more applications associated with the indicator from the application store;
receiving a user selection of the application from the listing of one or more applications; and
downloading, by the mobile computing device, the selected application.

27. The method of claim 26 wherein one of the applications in the listing of one or more applications is a preferred application.

28. The method of claim 27 wherein the preferred application is highlighted in the listing of one or more applications.

29. The method of claim 26 further comprising determining the network location based at least in part on information selected from a group consisting of: a protocol string, an application identifier, a preferred application identifier, and an application code.

30. The method of claim 23 wherein the application is installed upon being downloaded.

31. The method of claim 23 wherein the user purchases the application prior to downloading.

32. The method of claim 23 further comprising:
while the application is executing, communicating, by an operating system component of the mobile computing device, with the accessory using the accessory protocol.

33. The method of claim 23 wherein the application is a program that, when executed, provides a user interface for interacting with the accessory via the mobile computing device.

34. The method of claim 23 wherein the information identifying an application communication protocol received from the accessory device includes an application protocol name string formatted in a reverse domain name convention.

35. The method of claim 23 wherein the information identifying an application communication protocol received from the accessory device includes an identifier of a preferred application.

36. The method of claim 23 wherein communicating, by the application, with the accessory using the application communication protocol further includes:
receiving, at a port of the mobile computing device, a message from the accessory conforming to the accessory protocol, the message containing a bundle;
writing, by the operating system component of the mobile device, the bundle to an input stream; and
reading, by the application, the input stream, wherein the application interprets the input stream in accordance with the application communication protocol.

37. A mobile computing device comprising:
a communications interface configured to exchange commands and data with an accessory; and
a processor configured to:

receive, from an accessory device external to and communicatively coupled with the mobile computing device, a request for executing an application, the request including an indicator identifying a first set of one or more application protocols supported by the accessory for communicating with the application, wherein the request is received using an accessory protocol that is distinct from each of the one or more application protocols, wherein the accessory protocol enables communication between the accessory device and an operating system component of the mobile computing device and wherein each of the one or more application protocols is specific to one or more particular applications executable on the mobile computing device;

determine whether an application satisfying the request is available for execution at the mobile computing device, the determining comprising comparing the first set of one or more application protocols with a second set of one or more application protocols supported by applications installed on the mobile computing device;

if an application satisfying the request is not available for execution at the mobile computing device:

send information to an application store through a network, the information comprising at least a portion of the indicator;

download an application associated with the indicator from the application store, wherein the downloaded application is an application satisfying the request; and execute the application satisfying the request, wherein executing the application includes communicating, by the application, with the accessory using the application protocol, wherein communicating with the accessory using the application protocol includes:

writing, by the application, a message conforming to the application protocol to an output stream;

generating, by the operating system component of the mobile device, a bundle from the output stream; and transmitting the bundle to the accessory device via a port, wherein the bundle is transmitted in conformity with the accessory protocol.

38. The mobile computing device of claim 37 wherein the indicator further comprises an Internet-based address wherein the application can be downloaded, and wherein if the application is not available for execution at the mobile computing device, the application is downloaded based on the Internet-based address.

* * * * *